(12) United States Patent (10) Patent No.: US 9,227,365 B2
Dikovsky et al. (45) Date of Patent: Jan. 5, 2016

(54) SOLID FREEFORM FABRICATION OF SHELLED OBJECTS

(75) Inventors: Daniel Dikovsky, Rechovot (IL); Avraham Levy, Petach-Tikva (IL); Eduardo Napadensky, Natania (IL)

(73) Assignee: Stratasys Ltd., Rehovot (IL)

( * ) Notice: Subject to any disclaimer, the term of this patent is extended or adjusted under 35 U.S.C. 154(b) by 250 days.

(21) Appl. No.: 13/642,903

(22) PCT Filed: Apr. 21, 2011

(86) PCT No.: PCT/IB2011/051750
§ 371 (c)(1),
(2), (4) Date: Oct. 23, 2012

(87) PCT Pub. No.: WO2011/135496
PCT Pub. Date: Nov. 3, 2011

(65) Prior Publication Data
US 2013/0040091 A1 Feb. 14, 2013

Related U.S. Application Data

(60) Provisional application No. 61/327,693, filed on Apr. 25, 2010, provisional application No. 61/327,692, filed on Apr. 25, 2010, provisional application No. 61/447,743, filed on Mar. 1, 2011.

(51) Int. Cl.
*B29C 41/22* (2006.01)
*B29C 67/00* (2006.01)

(52) U.S. Cl.
CPC ......... *B29C 67/0059* (2013.01); *B29C 67/0055* (2013.01); *Y10T 428/23* (2015.01)

(58) Field of Classification Search
CPC .... B29C 41/02; B29C 41/22; B29C 67/0055; B29C 67/0059
USPC ........................................................ 264/255
See application file for complete search history.

(56) References Cited

U.S. PATENT DOCUMENTS 4,752,352 A * 6/1988 Feygin ........................... 216/33

FOREIGN PATENT DOCUMENTS

| CN | 1926470 | 3/2007 |
|----|---------|--------|
| EP | 1522412 | 4/2005 |
| JP | 2005-125324 | 5/2005 |
| WO | WO 2004/096514 | 11/2004 |
| WO | WO 2009/013751 | 1/2009 |
| WO | WO 2011/135496 | 11/2011 |

OTHER PUBLICATIONS

International Preliminary Report on Patentability Dated Nov. 8, 2012 From the International Bureau of WIPO Re. Application No. PCT/IB2011/051750.

(Continued)

*Primary Examiner* — Leo B Tentoni

(57) ABSTRACT

A method of layerwise solid freeform fabrication is disclosed. The method comprises, for each of at least a few of the layers, dispensing and hardening at least a first modeling material and a second modeling material to form a core region and one or more envelope regions at least partially surrounding the core region. In some embodiments, the ratio between the elastic moduli of adjacent regions, when hardened, is from about 1 to about 20.

17 Claims, 13 Drawing Sheets
(11 of 13 Drawing Sheet(s) Filed in Color)

(56) References Cited

OTHER PUBLICATIONS

International Search Report and the Written Opinion Dated Dec. 27, 2011 From the International Searching Authority Re. Application No. PCT/IB2011/051750.

Communication Relating to the Results of the Partial International Search Dated Sep. 26, 2011 From the International Searching Authority Re. Application No. PCT/IB2011/051750.

Notification of Office Action Dated Jul. 31, 2014 From the State Intellectual Property Office of the People's Republic of China re. Application No. 201180031502.5 and Its Translation Into English.

Search Report Dated Jul. 31, 2014 From the State Intellectual Property Office of the People's Republic of China re. Application No. 201180031502.5 and Its Translation Into English.

Communication Pursuant to Article 94(3) EPC Dated Sep. 26, 2013 From the European Patent Office Re. Application No. 11723654.7.

Notice of Reason for Rejection Dated Feb. 20, 2015 From the Japanese Patent Office Re. Application No. 2013-506784 and Its Translation Into English.

Notification of Office Action Dated May 19, 2015 From the State Intellectual Property Office of the People's Republic of China Re. Application No. 201180031502.5 and Its Translation Into English.

* cited by examiner

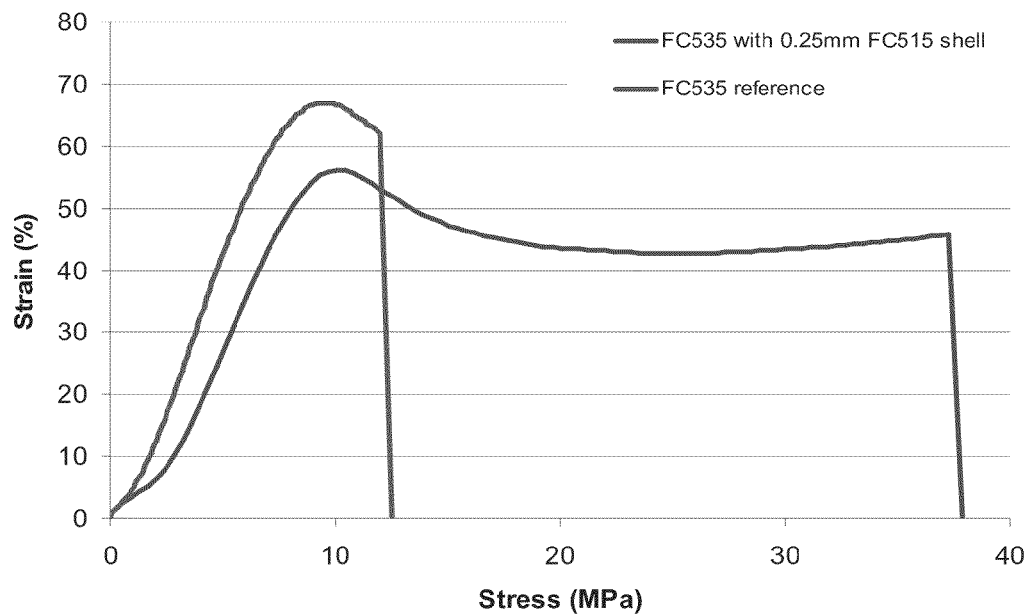
FIG. 8F
FIG. 9A
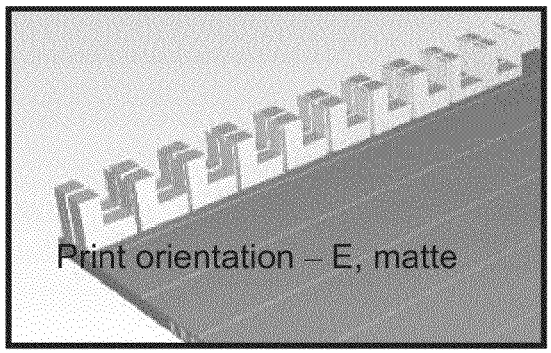
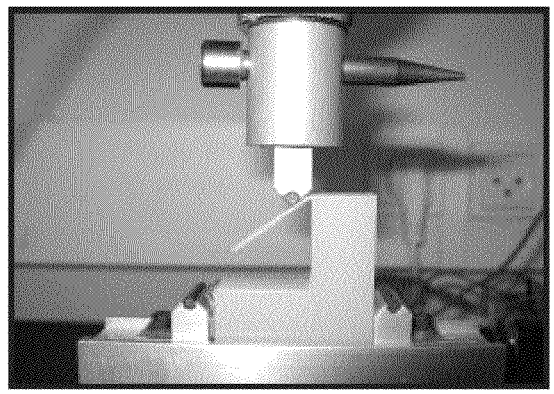
FIG. 9B
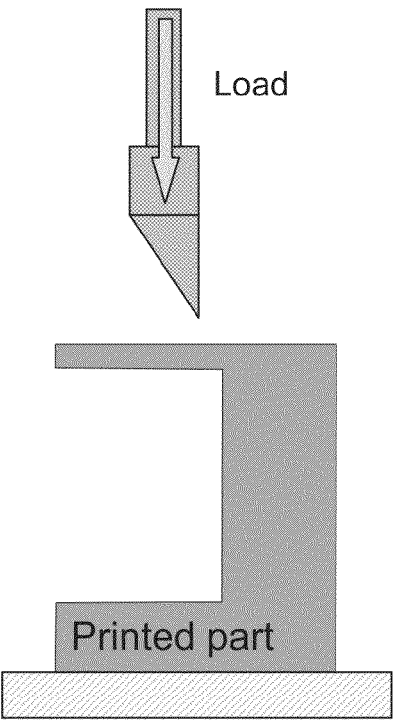
FIG. 9C

SOLID FREEFORM FABRICATION OF SHELLED OBJECTS

RELATED APPLICATIONS

This application is a National Phase of PCT Patent Application No. PCT/IB2011/051750 having International filing date of Apr. 21, 2011, which claims the benefit of priority under 35 USC §119(e) of U.S. Provisional Patent Application Nos. 61/327,692 filed on Apr. 25, 2010, 61/327,693 filed on Apr. 25, 2010 and 61/447,743 filed on Mar. 1, 2011.

The contents of all of the above applications are all incorporated by reference as if fully set forth herein in their entirety.

FIELD AND BACKGROUND OF THE INVENTION

The present invention, in some embodiments thereof, relates to solid freeform fabrication (SFF) and, more particularly, but not exclusively, to SFF of shelled objects.

SFF is a technology enabling fabrication of arbitrarily shaped structures directly from computer data via additive formation steps. The basic operation of any SFF system consists of slicing a three-dimensional computer model into thin cross sections, translating the result into two-dimensional position data and feeding the data to control equipment which fabricates a three-dimensional structure in a layerwise manner.

Solid freeform fabrication entails many different approaches to the method of fabrication, including three-dimensional printing, electron beam melting, stereolithography, selective laser sintering, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335 7,209,797, 7,225,045, 7,300,619 and 7,500,846, and U.S. Published Applications Nos. 20050104241 and 20060054039, all of the same Assignee, the contents of which are hereby incorporated by reference.

Solid freeform fabrication is typically used in design-related fields where it is used for visualization, demonstration and mechanical prototyping. Thus, SFF facilitates rapid fabrication of functioning prototypes with minimal investment in tooling and labor. Such rapid prototyping shortens the product development cycle and improves the design process by providing rapid and effective feedback to the designer. SFF can also be used for rapid fabrication of non-functional parts, e.g., for the purpose of assessing various aspects of a design such as aesthetics, fit, assembly and the like. Additionally, SFF techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

Several SFF techniques allow additive formation of objects using more than one modeling material. For example, U.S. Published Application No. 20100191360 of the present Assignee, the contents of which are hereby incorporated by reference, discloses a system which comprises a solid freeform fabrication apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

SUMMARY OF THE INVENTION

According to an aspect of some embodiments of the present invention there is provided a method of layerwise solid freeform fabrication. The method comprises, for each of at least a few of the layers: dispensing and hardening at least a first modeling material and a second modeling material to form a core region and one or more envelope regions at least partially surrounding the core region, thereby fabricating an object being constructed from a plurality of layers and a layered core constituting core regions and a layered shell constituting envelope regions.

According to some embodiments of the invention the one or more envelope regions comprise a plurality of envelope regions.

According to some embodiments of the invention a ratio between the elastic moduli of adjacent regions, when hardened, is from about 1 to about 20.

According to some embodiments of the invention for at least one pair of regions in the layer, a heat deflection temperature (HDT) characterizing an inner region of the pair is above 50° C., and an HDT characterizing an outer region of the pair is below 50° C.

According to some embodiments of the invention for at least one pair of regions in the layer, an outer region of the pair has a lower elastic modulus than an inner region of the pair.

According to some embodiments of the invention for at least one pair of regions in the layer, an outer region of the pair has a higher elastic modulus than an inner region of the pair.

According to some embodiments of the invention for any pair of regions in the layer, an outer region of the pair has a lower elastic modulus than an inner region of the pair.

According to some embodiments of the invention a heat deflection temperature (HDT) characterizing the core region is below about 50° C. and an HDT characterizing at least one of the envelope regions is above about 50° C. According to some embodiments of the invention for at least one pair of envelope regions, an HDT characterizing an inner envelope region of the pair is above 50° C., and an HDT characterizing an outer envelope region of the pair is below 50° C. According to some embodiments of the invention for at least one pair of envelope regions, an HDT characterizing an inner envelope region of the pair is above 50° C., and an HDT characterizing an outer envelope region of the pair is below 50° C. According to some embodiments of the invention for at least one pair of regions in the layer, a characteristic HDT is higher for an outer region of the pair than for an inner region of the pair.

According to some embodiments of the invention each of the core and envelope regions being characterized by an elongation-at-break value ($\epsilon_R$), when hardened, wherein the characteristic $\epsilon_R$ is higher for any of the envelope regions than for the core region. According to some embodiments of the invention for any pair of regions in the layer, the characteristic $\epsilon_R$ is higher for an outer region of the pair than for an inner region of the pair. According to some embodiments of the invention for at least one pair of regions in the layer, the characteristic $\epsilon_R$ of an outer region of the pair is higher by at least 30% than the characteristic $\epsilon_R$ of an inner region of the pair. According to some embodiments of the invention for at least one pair of regions in the layer, a characteristic $\epsilon_R$ of an outer region of the pair is at least 30%, and a characteristic $\epsilon_R$ of an inner region of the pair is from about 2% to about 15%.

According to some embodiments of the invention the first modeling material and the second modeling material are characterized by a glass transition temperature (Tg) which is below 10° C. According to some embodiments of the invention for at least one pair of regions in the layer, the characteristic $\epsilon_R$ of an outer region of the pair is at least 200%, and the characteristic $\epsilon_R$ of an inner region of the pair is from about 1% to about 100%. According to some embodiments of the invention a characteristic tensile tear resistance (TR) of the core region is lower than a characteristic TR of at least one of the envelope regions.

According to some embodiments of the invention each of the regions is characterized by an Izod impact resistance (IR) value and an HDT, when hardened, wherein for at least one pair of regions in the layer, an inner region of the pair is characterized a lower IR value and higher HDT value relative to an outer region of the pair. According to some embodiments of the invention the inner region is characterized by an IR value of about 20 J/m. According to some embodiments of the invention the outer region is characterized by IR value of at least 40 J/m. According to some embodiments of the invention the inner region is characterized by HDT of at least 60° C. According to some embodiments of the invention the inner region is characterized by HDT of at most 50° C.

According to some embodiments of the invention the outer region is an outermost region of the pair.

According to some embodiments of the invention the inner region is the core region.

According to some embodiments of the invention the inner region is an envelope region.

According to some embodiments of the invention a width of the envelope region is non-uniform across the layer.

According to some embodiments of the invention a width of the envelope region is calculated separately for each layer.

According to some embodiments of the invention a width of the envelope region is at least 10 μm.

According to some embodiments of the invention at least one of the core region and the envelope comprises the first and the second materials being interlaced over the respective region in a pixelated manner, and wherein for each of the first material and the second material, a relative surface density of the material in the core region is different from a relative surface density of the material in the envelope region.

According to some embodiments of the invention the core region comprises the first and the second materials being interlaced over the core region in a pixelated manner, and wherein the envelope region comprises only the second material.

According to some embodiments of the invention the method further comprises dispensing at least one of the first modeling material and the second modeling material to form at least one shell part parallel to the layers, wherein a material property characterizing the at least one shell part is different from a material property characterizing the core.

According to some embodiments of the invention the shell part(s) comprises at least one layer which is dispensed subsequently to any layer having the core region and the one or more envelope regions.

According to some embodiments of the invention the shell part(s) comprises at least one layer which is dispensed prior to any layer having the core region and the one or more envelope regions.

According to some embodiments of the invention the shell part(s) has a thickness which is less than a lateral width of the envelope.

According to some embodiments of the invention the first material is characterized by at least one property selected from the group consisting of an impact resistance from about 10 J/m to about 20 J/m, a heat distortion temperature at 0.45 mPa from about 51° C. to about 150° C., a strain at break from about 2% to about 15%, elastic modulus from about 2.3 GPa to about 3.5 GPa, and glass transition temperature from about 70° C. to about 170° C.

According to some embodiments of the invention the second material is characterized by at least one property selected from the group consisting of an impact resistance of about 45-120 J/m, a heat distortion temperature at 0.45MPa of about 25 to 39° C., a strain at break of about 40 to 100%, elastic modulus of about 0.5 to 1.5 GPa, and glass transition temperature from about 25 to 40° C.

According to some embodiments of the invention the first material is characterized by at least one property selected from the group consisting of a tensile strength from about 3 MPa to about 5 MPa, a strain at break from about 45% to about 50%, tensile tear resistance from about 8 Kg/cm to about 12 Kg/cm, and glass transition temperature from about 0° C. to about 4° C.

According to some embodiments of the invention the second material is characterized by at least one property selected from the group consisting of a tensile strength from about 1 MPa to about 2 MPa, a strain at break higher than 50%, and glass transition temperature from about −12° C. to about 0° C.

According to some embodiments of the invention the first material is characterized by at least one property selected from the group consisting of heat distortion temperature from about 45° C. to about 51° C. and Izod impact resistance value from about 20 J/m to about 30 J/m.

According to some embodiments of the invention the first material is characterized by at least one property selected from the group consisting of heat distortion temperature at 0.45 MPa from about 34° C. to about 38° C. and Izod impact resistance value from about 40 J/m to about 50 J/m.

According to some embodiments of the invention any two adjacent regions of the regions are bound to each other upon hardening.

According to an aspect of some embodiments of the present invention there is provided a computer software product, comprising a computer-readable medium in which program instructions are stored, which instructions, when read by a computerized controller of a solid freeform fabrication system, cause the system to execute at least some operations of the method described herein.

According to an aspect of some embodiments of the present invention there is provided a layered structure fabricatable from thermosetting materials by a solid freeform fabrication method the method described herein.

According to an aspect of some embodiments of the present invention there is provided a layered polymeric structure fabricated from thermosetting materials by a solid freeform fabrication method, comprising a layered core at least partially surrounded by one or more layered shells such that at least one layer of the core engages the same plane with a layer of at least one of the shells, wherein a ratio between elastic moduli of the core and the shell is from about 1 to about 20.

According to some embodiments of the invention the layered structure is characterized by at least one property selected from the group consisting of: (i) a strain at break of at least 80% within a temperature range from about 25° C. to about 40° C.; (ii) a tensile strength of at least 3 MPa within the temperature range; and (iii) Tg below room temperature;

According to some embodiments of the invention the layered structure is characterized by at least one property selected from the group consisting of: (i) a strain at break of at least 15% within a temperature range from about 25° C. to about 40° C.; (ii) a tensile strength of at least 25 MPa within the temperature range; (iii) HDT above room temperature; and (iv) Impact resistance above 40 J/m According to some embodiments of the invention the layered shell(s) comprises at least a first layered shell and a second layered shell, such that at least one layer of the first layered shell engages the same plane with a layer of the second layered shell, wherein the first layered shell is between the core and the second layered shell.

According to some embodiments of the invention the core has a curling tendency which is lower than a curling tendency of at least one of the shells, wherein an HDT characterizing the core region is about 50° C. or less, wherein the first shell comprises a material having HDT higher than 50° C., and wherein the second shell has an Izod impact resistance higher than 40 J/m.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1A:
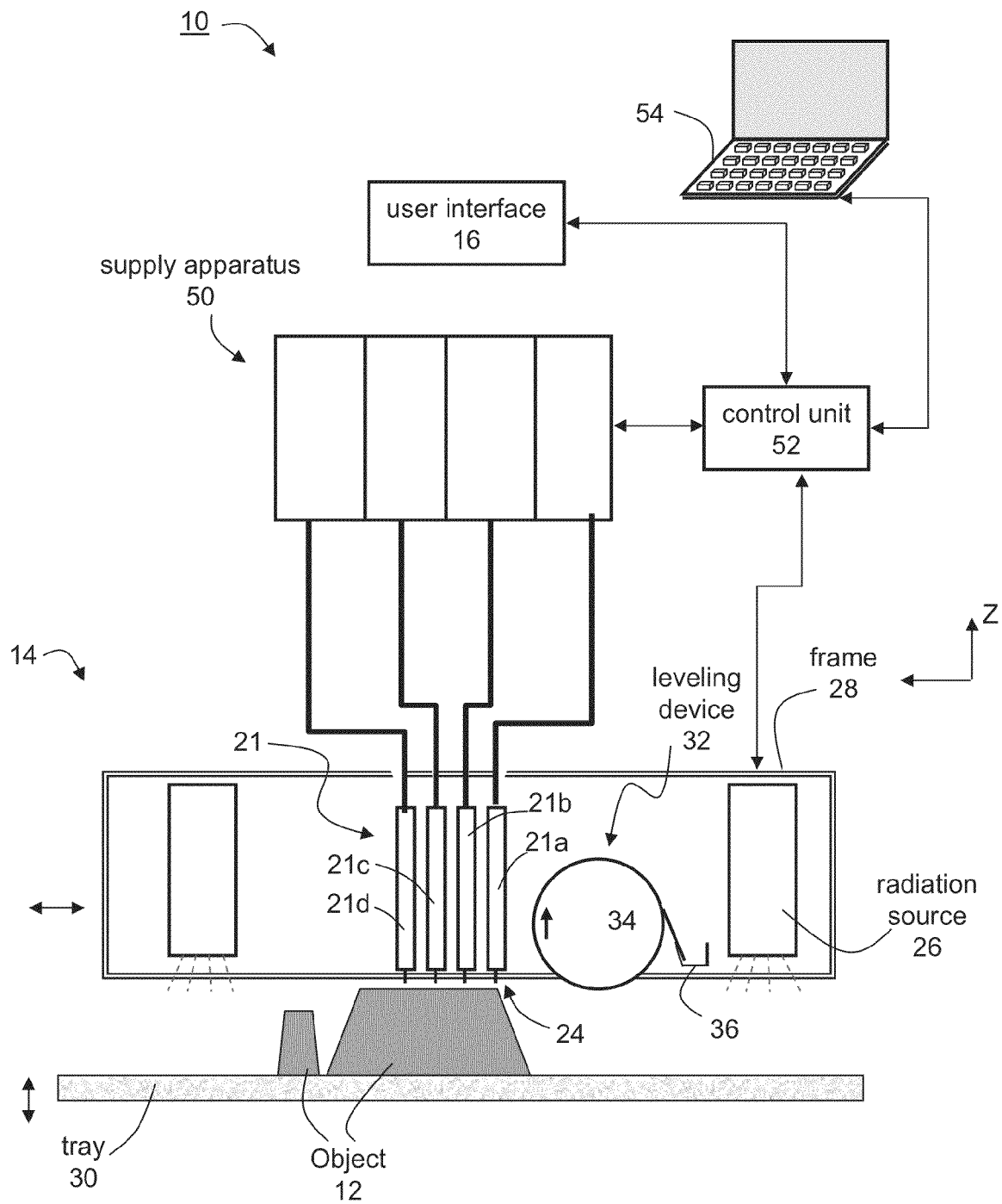
Figure 1B:
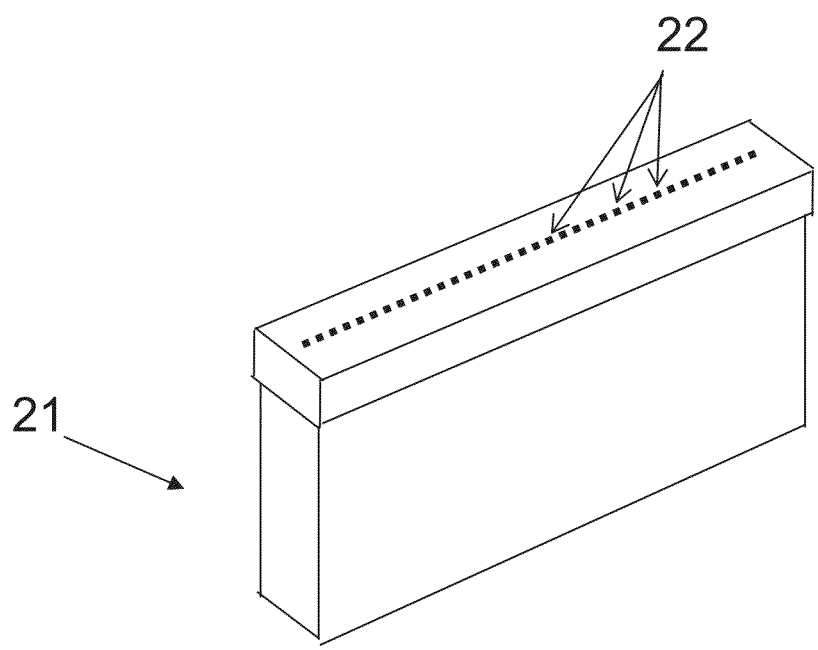
Figure 3:
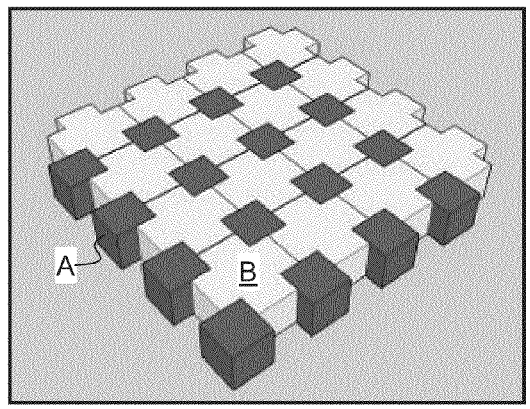
Figure 5:
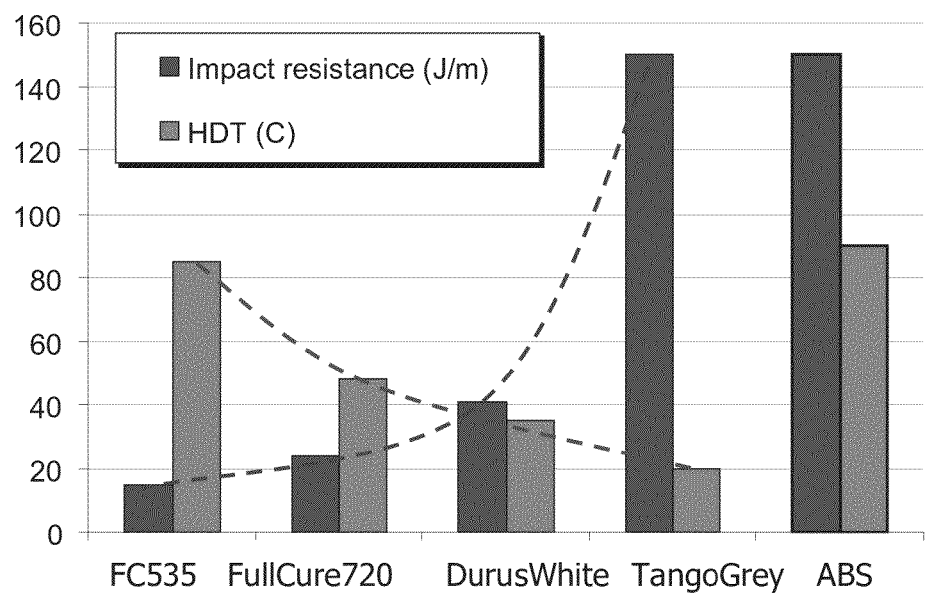
Figure 6:
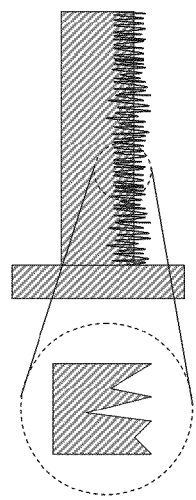
Figure 7A:
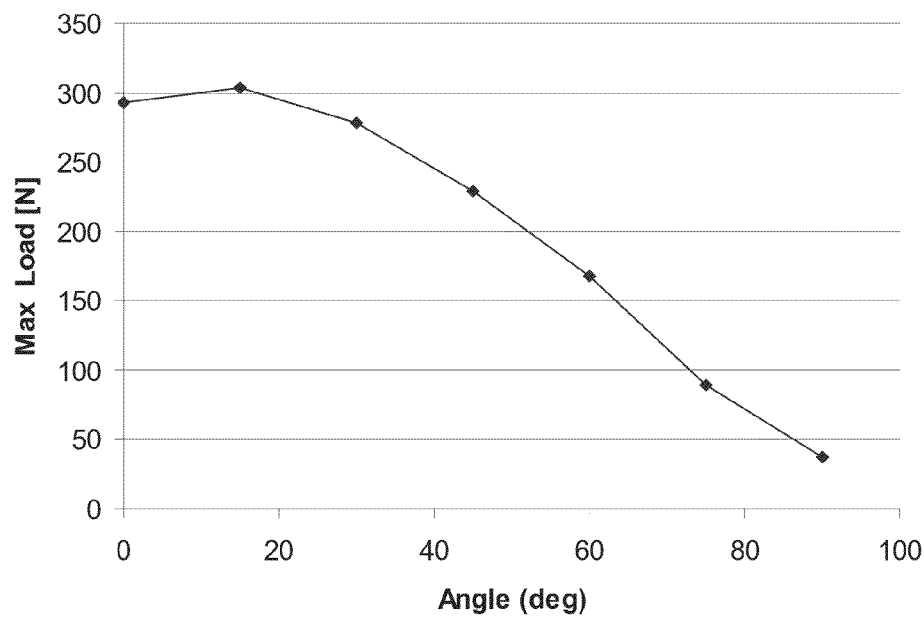
Figure 7B:
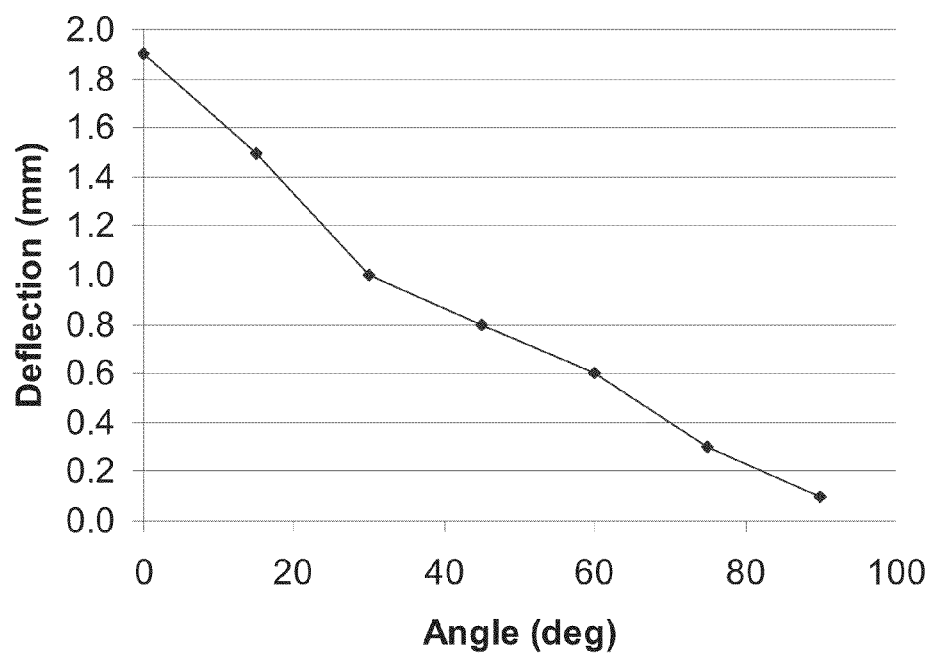
Figure 8A:
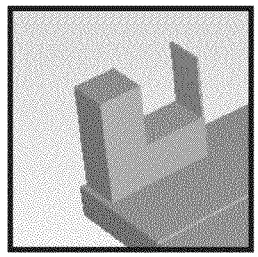
Figure 8B:
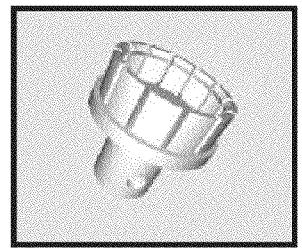
Figure 8C:
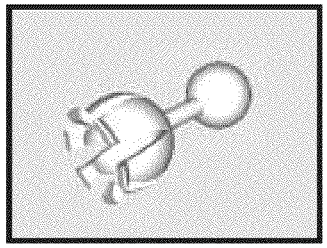
Figure 8D:
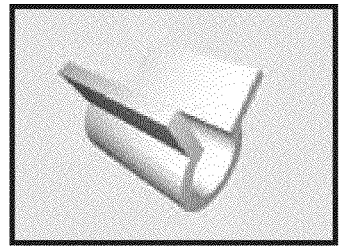
Figure 8E:
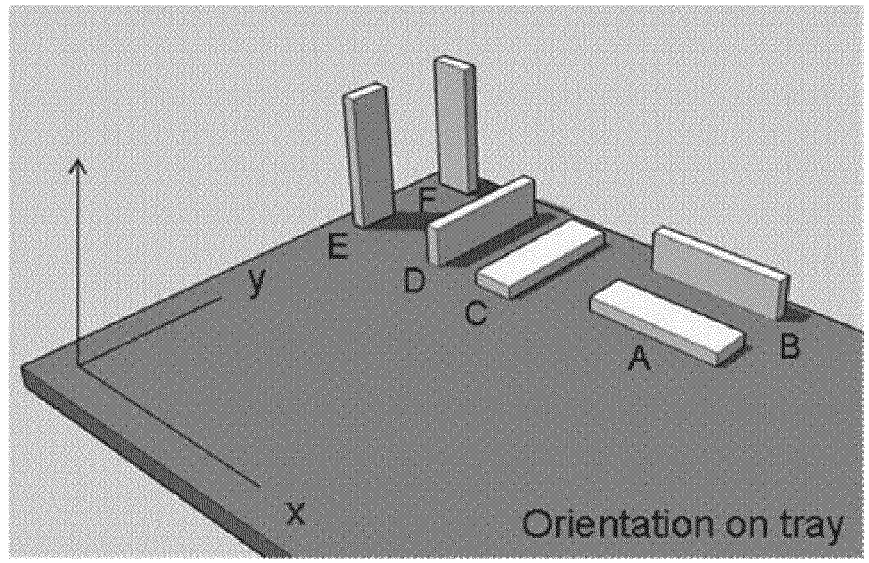
Figure 10A:
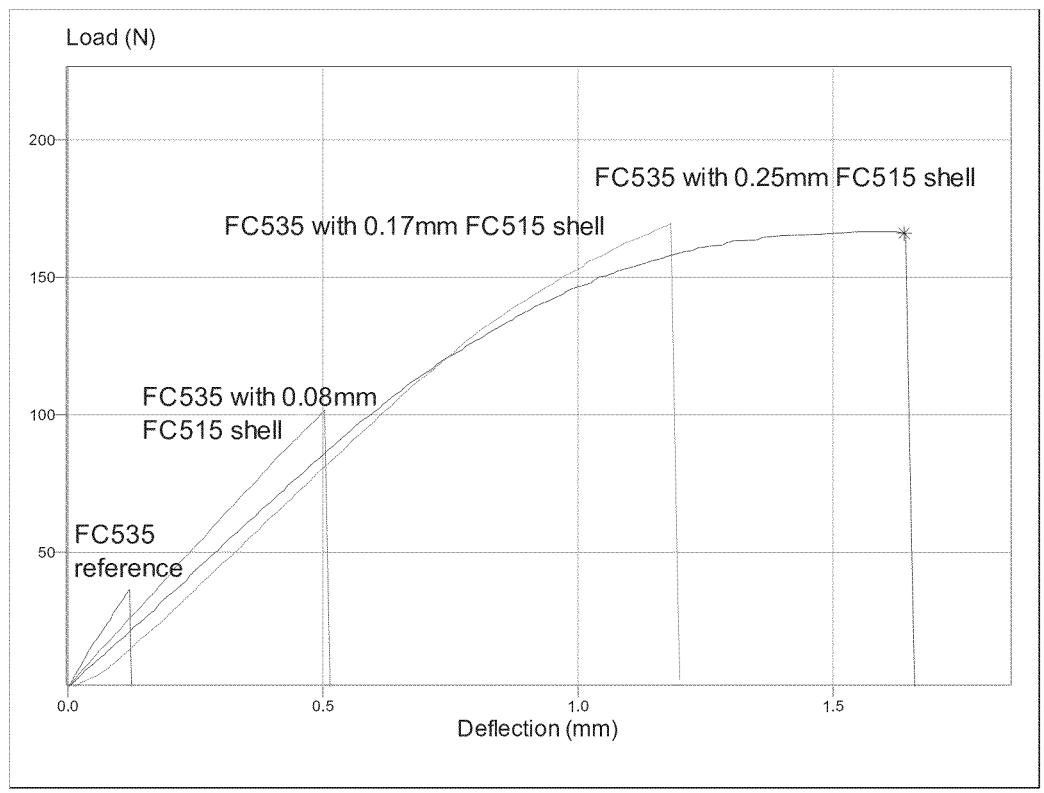
Figure 10B:
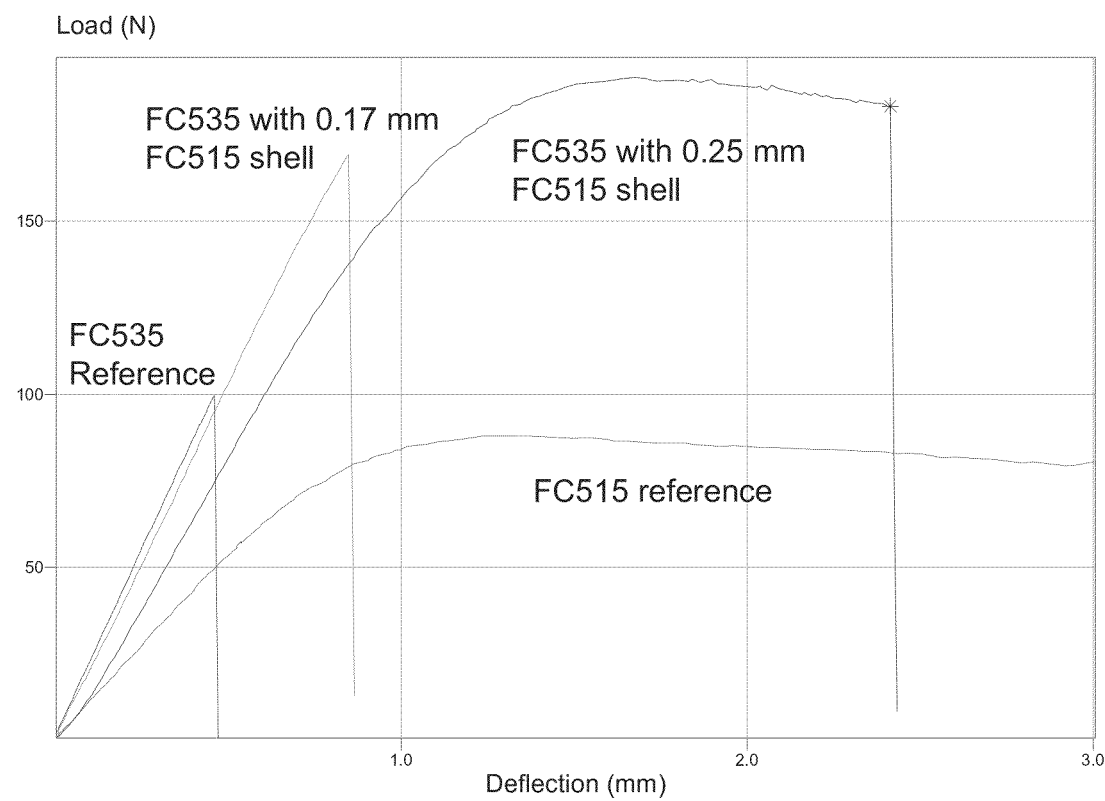
Figure 11:
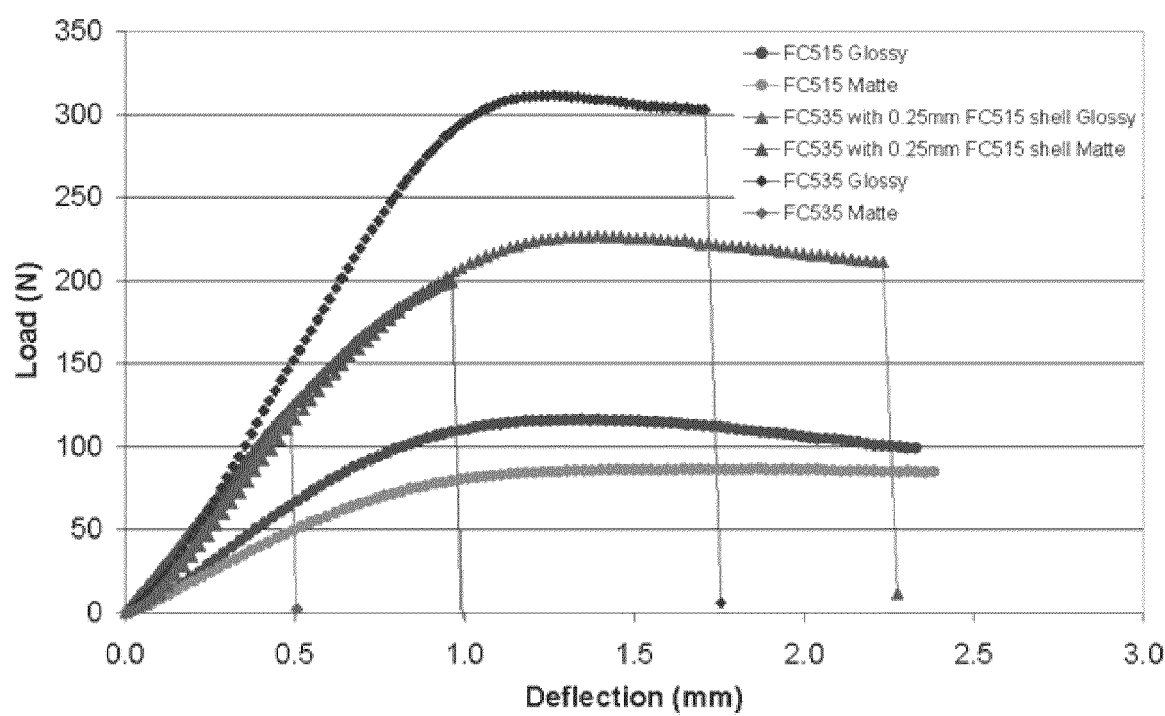
Figure 12A:
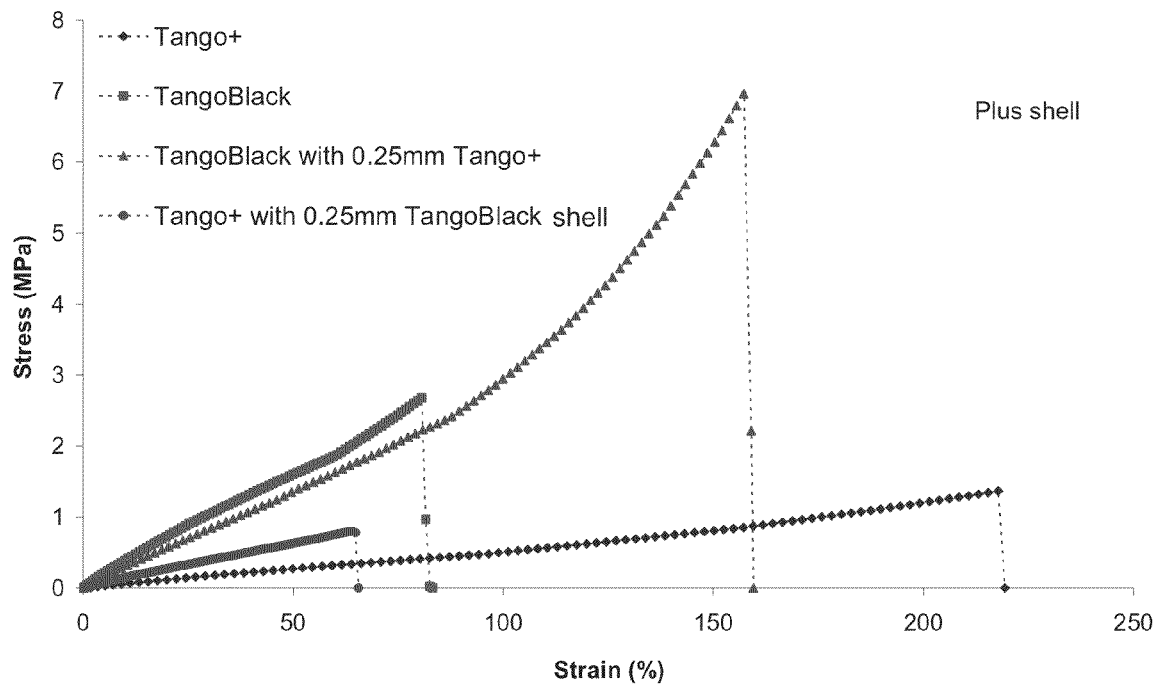
Figure 12B:
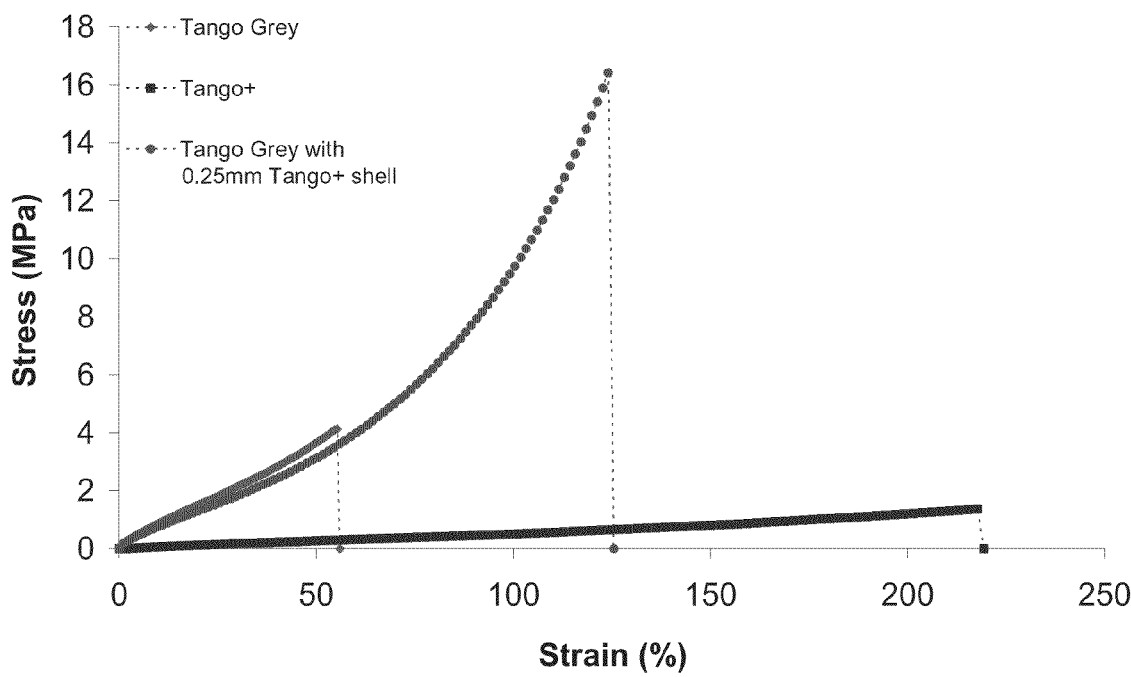
Figure 13:
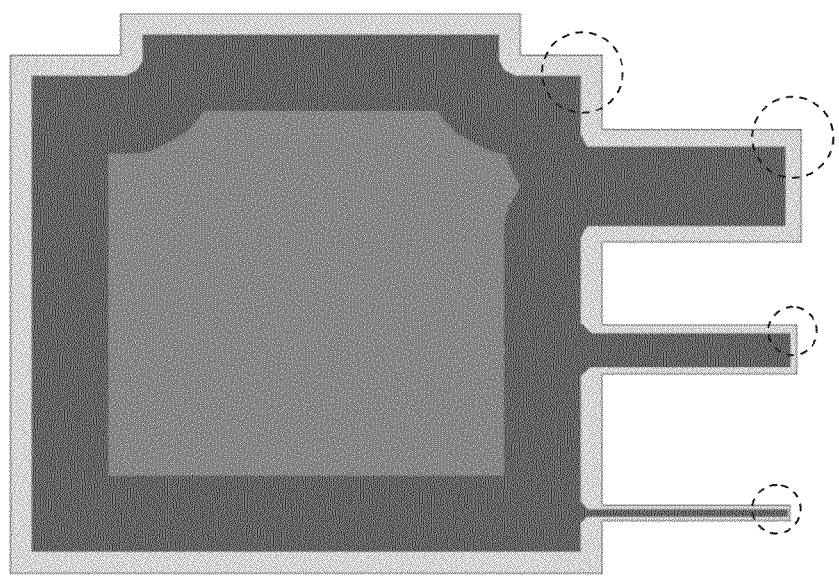

FIGS. 1A-B are schematic illustrations of a representative and non-limiting example of a system suitable for solid freeform fabrication, according to some embodiments of the present invention;

FIGS. 2A-D are schematic illustrations of a representative and non-limiting example of a structure according to some embodiments of the present invention;

FIG. 3 is a schematic illustration of a region which includes interlaced modeling materials;

FIGS. 4A-E are schematic illustrations of various types of layers, according to some embodiments of the present invention;

FIG. 5 shows results of experiments performed according to some embodiments of the present invention for determining the relationship between Heat Distortion Temperature (HDT) and impact resistance in several modeling materials;

FIG. 6 is a schematic illustration of microscopic surface cracks at the vertical sides of a fabricated structure;

FIGS. 7A and 7B show deflection at break and maximal load at break of beams printed using a FullCure®535 modeling material, as measured in experiments performed according to some embodiments of the present invention;

FIGS. 8A-D are illustrations of specimens fabricated in test experiments performed according to some embodiments of the present invention;

FIG. 8E is a schematic illustration which describes several orientations of structures on a printing tray;

FIG. 8F shows comparative results of a tensile test of a shelled and a non-shelled structures, as measured in experiments performed according to some embodiments of the present invention;

FIGS. 9A-C are schematic illustrations (FIGS. 9A and 9C) and an image (FIG. 9B) describing a bending test performed according to some embodiments of the present invention;

FIGS. 10A-B show bending test results obtained according to some embodiments of the present invention for 1 mm, 2 mm and 3 mm structures with and without a shell;

FIG. 11 shows experimental results obtained in an experiment performed according to some embodiments of the present invention to investigate the influence of high resolution print mode;

FIGS. 12A-B show tensile stress as a function of tensile strain, as obtained in experiments performed according to some embodiments of the present invention; and FIG. 13 is a schematic illustration of a layer with thin parts which can be fabricated according to some embodiments of the present invention.

DESCRIPTION OF SPECIFIC EMBODIMENTS OF THE INVENTION

The present invention, in some embodiments thereof, relates to solid freeform fabrication (SFF) and, more particularly, but not exclusively, to SFF of shelled objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments fabricate three-dimensional objects in a layerwise manner by forming a plurality of layers in a configured pattern corresponding to the shape of the objects.

The term "object" as used herein refers to a whole object or a part thereof.

Each layer is formed by solid freeform fabrication apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In some embodiments of the present invention the SFF comprises three-dimensional printing. In these embodiments a building material is dispensed from a dispensing head having a set of nozzles to deposit building material in layers on a supporting structure. The SFF apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in solid freeform fabrication and which is able to form a three-dimensional object on its own, i.e., without having to be mixed or combined with any other substance.

The final three-dimensional object is made of the modeling material or a combination of modeling and support material or modification thereof (e.g., following curing). All these operations are well-known to those skilled in the art of solid freeform fabrication.

In various exemplary embodiments of the invention an object is fabricated by dispensing two or more different modeling materials, each material from a different dispensing head of the SFF. The materials are optionally and preferably deposited in layers during the same pass of the printing heads. The materials and combination of materials within the layer are selected according to the desired properties of the object.

A representative and non-limiting example of a system 10 suitable for SFF of an object 12 according to some embodiments of the present invention is illustrated in FIGS. 1A-B. System 10 comprises a solid freeform fabrication apparatus 14 having a plurality of dispensing heads 21. Each head preferably comprises an array of one or more nozzles 22, as illustrated in FIG. 1B, through which a building material 24 is dispensed.

Preferably, but not obligatorily, apparatus 14 is a three-dimensional printing apparatus, in which case dispensing heads 21 are printing heads, and the building material is dispensed via inkjet technology. This need not necessarily be the case, since, for some applications, it may not be necessary for the solid freeform fabrication apparatus to employ three-dimensional printing techniques. Representative examples of solid freeform fabrication apparatus contemplated according to various exemplary embodiments of the present invention include, without limitation, binder jet-powder base apparatus and fused deposition modeling apparatus, fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 21a, 21b, 21c and 21d are illustrated. Each of heads 21a, 21b, 21c and 21d has a nozzle array. In this Example, heads 21a and 21b can be designated for modeling material/s and heads 21c and 21d can be designated for support material. Thus, head 21a can dispense a first modeling material, head 21b can dispense a second modeling material and heads 21c and 21d can both dispense support material. In an alternative embodiment, heads 21c and 21d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each fabricated layer, the height of modeling material equals the height of support material. Typical values for a are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 14 can further comprise one or more radiation sources 26, which can be, for example, an ultraviolet or visible or infrared lamp, or other sources of electromagnetic radiation, or electron beam source, depending on the modeling material being used. Radiation source 26 serves for curing or solidifying the modeling material.

Dispensing head 21 and radiation source 26 are preferably mounted in a frame or block 28 which is preferably operative to reciprocally move over a tray 30, which serves as the working surface. According to the common conventions, tray 30 is positioned in the X-Y plane. Tray 30 is preferably configured to move vertically (along the Z direction), typically downward. In various exemplary embodiments of the invention, apparatus 14 further comprises one or more leveling devices 32, e.g. a roller 34. Leveling device 32 serves to straighten, level and/or establish a thickness of the newly formed layer prior to the formation of the successive layer thereon. Leveling device 32 preferably comprises a waste collection device 36 for collecting the excess material generated during leveling. Waste collection device 36 may comprise any mechanism that delivers the material to a waste tank or waste cartridge.

In use, dispensing heads 21 move in a scanning direction, which is referred to herein as the X direction, and selectively dispense building material in a predetermined configuration in the course of their passage over tray 30. The building material typically comprises one or more types of support material and one or more types of modeling material. The passage of heads 21 is followed by the curing of the modeling material(s) by radiation source 26. In the reverse passage of heads 21, back to their starting point for the layer just deposited, an additional dispensing of building material may be carried out, according to predetermined configuration. In the forward and/or reverse passages of heads 21, the layer thus formed may be straightened by leveling device 32, which preferably follows the path of heads 21 in their forward and/or reverse movement. Once heads 21 return to their starting point along the X direction, they may move to another position along an indexing direction, referred to herein as the Y direction, and continue to build the same layer by reciprocal movement along the X direction. Alternately, heads 21 may move in the Y direction between forward and reverse movements or after more than one forward-reverse movement. The series of scans performed by heads 21 to complete a single layer is referred to herein as a single scan cycle.

Once the layer is completed, tray 30 is lowered in the Z direction to a predetermined Z level, according to the desired thickness of the layer subsequently to be printed. The procedure is repeated to form three-dimensional object 12 in a layerwise manner.

In another embodiment, tray 30 may be displaced in the Z direction between forward and reverse passages of head 21, within the layer. Such Z displacement is carried out in order to cause contact of the leveling device with the surface in one direction and prevent contact in the other direction.

System 10 further comprises a building material supply apparatus 50 which comprises the building material containers or cartridges and supplies a plurality of building materials to fabrication apparatus 14. A control unit 52 controls fabrication apparatus 14 and supply apparatus 50 based on the operation mode of system 10. Control unit 52 preferably communicates with a data processor 54 which transmits digital data pertaining to fabrication instructions based on computer object data, e.g., in a form of a Standard Tessellation Language (STL) or a StereoLithography Contour (SLC) format. Typically, control unit 52 controls the voltage applied to each dispensing head or nozzle array and the temperature of the building material in the respective printing head.

As further detailed hereinbelow the present embodiments contemplate the fabrication of an object by dispensing different materials from different dispensing heads. The present embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations. Any post deposition combination or mix of modeling materials is contemplated.

For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an SFF system such as system 10 is found in U.S. Published Application No. 20100191360, the contents of which are hereby incorporated by reference.

Even though SFF is widely practiced and has become a routine procedure for fabricating arbitrarily shaped structures throughout the world, the present Inventor found that it is not without certain operative limitations. For example, the present Inventors found that the range of thermo-mechanical properties obtainable from currently available modeling materials is usually insufficient, in particular for those modeling materials which are related to UV polymerization, and which are formed of low molecular weight raw materials (e.g., monomers and oligomers), and especially if the raw materials polymerize by a radical mechanism, e.g. the addition reaction of acrylic functional groups.

For example, in PolyJet™ systems, marketed by Objet Geometries Ltd., Israel, rigid materials with Heat Distortion Temperature (HDT) higher than room temperature, e.g., about 50 C or higher, are obtained by formulating products which upon UV irradiation produces a cross-linked polymer material. As a matter of comparison, in thermoplastic polymers, rigidity may be achieved by crystalline regions, polymer chain entanglements or high average molecular weight polymers, and this without the need for cross linking. Although in principle, in UV polymerized material such entanglements may occur when using high molecular weight oligomers (e.g., above 50,000 gr/mol), these are less preferred by the industry since the relatively high viscosity of such oligomers makes them difficult to be implemented in inkjet based printing or stereolithography.

Use of modeling materials having low molecular weight, e.g., below 5000 gr/mol, tends to result in amorphous structures having mechanical properties that are correlated to the polymer Glass Transition Temperature ($T_g$) and HDT. The value of $T_g$, in turn, amongst others, depends on the backbone flexibility and cross-linking density of the polymer, or, more specifically, on the average number of reactive groups per molecule of raw material. It was found by the present inventors that when the $T_g$ of an amorphous material is increased, the brittleness of the material is also increased, and therefore the capability of the material for stress dissipation is also reduced.

In experiments performed by the present inventors a negative correlation was found between the impact resistance of a modeling material and its HDT (see FIG. 5 in the Examples section that follows). A similar correlation was found by the present inventors between elongation at break and $T_g$ or HDT.

As an additional example, rubber-like materials which are typically used in PolyJet™ systems are considered. These materials are formulated to have relatively low viscosity permitting dispensing for example by inkjet, and to develop $T_g$ which is lower than room temperature, e.g., 10° C. or lower. The latter is obtained by formulating a product with relatively low degree of cross-linking and by using monomers and oligomers with intrinsic flexible molecular structure. However, PolyJet rubber-like material tends to have low tear resistance (TR) value and/or slow return velocity after deformation, when compared, for example, to a rubber material.

Herein, "$T_g$" refers to glass transition temperature defined as the location of the local maximum of the E" curve, where E" is the loss modulus of the material as a function of the temperature.

It is recognized that some modeling materials, particularly UV polymerizable materials, exhibit undesired deformation such as curling during the freeform fabrication of the object. In a search made by the inventors of the present invention for a solution to the problem of curling, it was found that the extent of curling is proportional to the extent of volumetric shrinkage that the material undergoes during the polymerization process and the temperature difference between material HDT and the system's temperature during fabrication. The present inventors found that the curling is particularly noticeable for materials with relatively high volumetric shrinkage and relatively high HDT (e.g., within the range of the polymerization temperature).

The present inventors have devised a layered polymeric object or structure which enjoys thermo-mechanical properties which are improved compared to other objects fabricated via SFF.

Generally, the structure according to various exemplary embodiments of the present invention is a shelled structure made of two or more thermosetting (e.g., UV polymerizable) modeling materials. The structure typically comprises a layered core which is at least partially coated by one or more layered shells such that at least one layer of the core engages the same plane with a layer of at least one of the shells. The thickness of each shell, as measured perpendicularly to the surface of the structure, is typically at least 10 µm. In various exemplary embodiments of the invention, the core and the shell are different from each other in their thermo-mechanical properties. This is readily achieved by fabricating the core and shell from different modeling materials or different combinations of modeling materials. The thermo-mechanical properties of the core and shell are referred to herein as "core thermo-mechanical properties" and "shell thermo-mechanical properties," respectively.

A representative and non-limiting example of a structure according to some embodiments of the present invention is shown in FIGS. 2A-D.

Figure 2A:
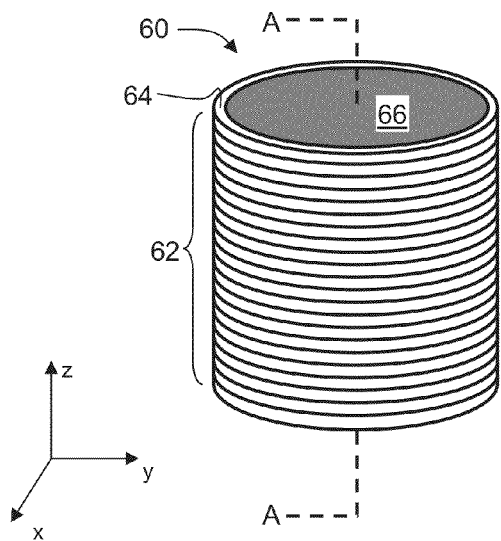
Figure 2B:
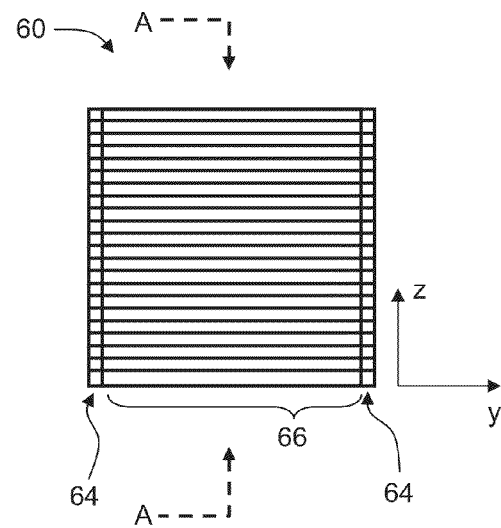

FIG. 2A is a schematic illustration of a perspective view a structure 60, and FIG. 2B is a cross-sectional view of structure 60 along line A-A of FIG. 2A. For clarity of presentation a Cartesian coordinate system is also illustrated.

Structure 60 comprises a plurality of layers 62 stacked along the z direction. Structure 60 is typically fabricated by an SFF technique, e.g., using system 10, whereby the layers are formed in a sequential manner. Thus, the z direction is also referred to herein as the "build direction" of the structure. Layers 62 are, therefore, perpendicular to the build direction. Although structure 60 is shown as a cylinder, this need not necessarily be the case, since the structure of the present embodiments can have any shape.

The shell and core of structure 60 are shown at 64 and 66, respectively. As shown, the layers of core 66 and the layers of shell 64 are co-planar. The SFF technique allows the simultaneous fabrication of shell 64 and core 66, whereby for a particular formed layer, the inner part of the layer constitutes a layer of the core, and the periphery of the layer, or part thereof, constitutes a layer of the shell.

Figure 2C:
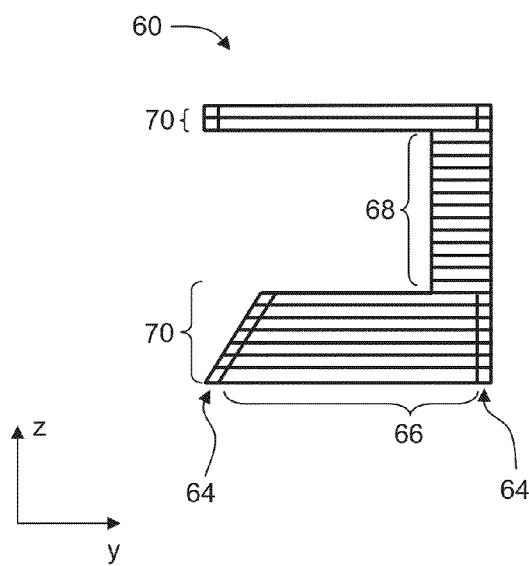

A peripheral section of a layer which contributes to shell 64 is referred to herein as an "envelope region" of the layer. In the non-limiting example of FIGS. 2A and 2B, each of layers 62 has an envelope region. Namely, each layer in FIGS. 2A and 2B contributes both to the core and to the shell. However, this need not necessarily be the case, since, for some applications, it may be desired to have the core exposed to the environment in some regions. In these applications, at least some of the layers do not include an envelope region. A representative example of such configuration is illustrated in the cross-sectional view of FIG. 2C, showing some layers 68 which contribute to the core but not to the shell, and some layers 70 which contribute to both the core and the shell. In some embodiments, one or more layers do not include a region with core thermo-mechanical properties and comprise only a region with shell thermo-mechanical properties. These embodiments are particularly useful when the structure has one or more thin parts, wherein the layers forming those parts of the structure are preferably devoid of a core region. A representative example of such a structure is illustrated in FIG. 13 which is described in greater detail in the Examples section that follows. Also contemplated are embodiments in which one or more layers do not include a region with shell thermo-mechanical properties and comprise only a region with core thermo-mechanical properties.

Figure 2D:
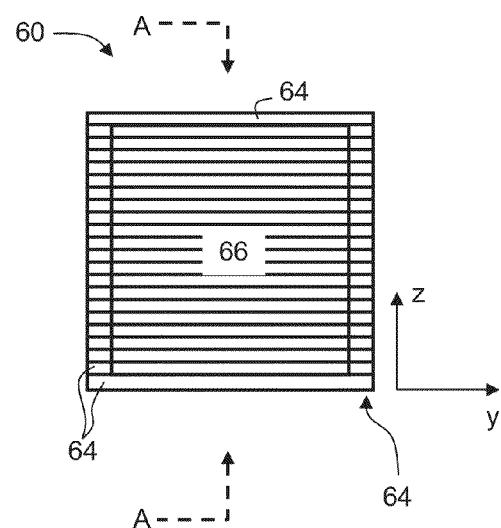

The shell can, optionally and preferably, also cover structure 60 from above and/or below, relative to the z direction. In these embodiments, some layers at the top most and/or bottom most parts of structure 60 have at least one material property which is different from core 66. In various exemplary embodiments of the invention the top most and/or bottom most parts of structure 60 have the same material property as shell 64. A representative example of this embodiment is illustrated in FIG. 2D. The top/bottom shell of structure 60 may be thinner (e.g., 2 times thinner) than the side shell, e.g. when the top or bottom shell comprises a layer above or below the structure, and therefore has the same thickness as required for layers forming the object.

A preferred process suitable for forming a structure via SFF is described hereinunder.

Before providing a further detailed description of the structure and method according to some embodiments of the present invention, attention will be given to the advantages and potential applications offered thereby.

The present inventors have devised a layered manufacturing SFF technology permits building objects with improved thermo-mechanical properties, even when those properties are not possessed by any one of the modeling materials used for fabricating the object. For example, embodiments of the present invention permit fabricating structures with high temperature resistance as well as high toughness. In the field of SFF using thermosetting materials (e.g., UV curable materials) such properties are not possessed by any of the known modeling materials, since a modeling material with high temperature resistance is relatively brittle, whereas modeling material with high toughness has relatively low temperature resistance. Embodiments of the present invention also permit fabricating structures with, for example, high temperature resistance as well as low curling. Embodiments of the present invention also permit fabrication of structures based on elastomeric materials. For example, embodiments of the present invention permit the fabrication of an elastomeric structure with relatively fast return time as well as increased tear resistance.

Since the shell(s) and core of the present embodiments are fabricated simultaneously, the parameters of the shell(s), e.g., thickness, selective coverage, variable thickness and composition, and the like, can be controlled with high level of accuracy. This is in contrast to conventional post fabrication coating techniques in which it is very difficult to control these parameters.

It was unexpectedly found by the present inventors that even a relatively thin shell (e.g., about 100 μm as measured in a plane perpendicular to the surface of the structure), may effect the thermo-mechanical properties of the structure significantly, compared to a non-shelled structure of the same dimension. The present inventors found that this effect is dictated by the properties of the shell and the properties of an adjacent and inner shell or core. This effect is advantageous because it allows fabrication of structures having thermo-mechanical properties which cannot be provided by a structure which is fabricated without a core-shell relationship.

In some embodiments of the present invention the shell material for a rigid structure is characterized by a strain at break of at least 80% within a temperature range of from about 25° C. to about 40° C. In some embodiments of the present invention the shell material is characterized by a tensile strength of at least 1000 MPa within a temperature range of from about 25° C. to about 40° C. In some embodiments of the present invention the shell material is characterized by a Heat Distortion Temperature (HDT) of at least 25° C. In some embodiments of the present invention the shell material characterized by an impact resistance of about 45 J/m within a temperature range of from about 25° C. to about 40° C.

Any one or combination of the above mechanical and thermal properties can be achieved by a judicious selection of the properties and makeup of the modeling materials from which the core and shell are formed. In some embodiments of the present invention the shell has lower stiffness than the core. In experiments performed by the present inventors, it was found that improved thermo-mechanical properties can be obtained by selecting the elastic modulus ratio between two adjacent shells materials or between the shell (covering the core) material and the core material, to be from about 1 to about 20. In some embodiments, the ratio is from about 1.3 to about 5.

When it is desired to fabricate a structure with enhanced toughness, the material with the lowest modulus is preferably used as the outer shell material and the material with the higher modulus is preferably used as the inner shell or core material.

When it is desired to fabricate a structure with enhanced thermal resistance and reduced contribution to curling, the material with the higher modulus is preferably used as the shell and the material with the lower modulus is preferably used as the core. Also contemplated are embodiments in which an additional outermost shell is added, such that the structure has a core, and intermediate shell and an outermost shell characterized by low curling, high temperature resistance and high toughness, respectively.

In some embodiments of the present invention the core has an HDT which is below 60° C., 50° C. or below 40° C. or below 30° C. and the shell has an HDT which is above 60° C. or above 50° C. or above 40° C. or above 30° C., as measured by an ASTM standard method, as further detailed hereinbelow. In such embodiments, an object with relatively low curling and high temperature resistance can be obtained, the low HDT core is responsible for the low curling tendency and the high HDT of the shell contributes to high temperature resistance of the fabricated object.

In some embodiments, the core and shell of the fabricated structure differ in their heat distortion temperature (HDT) and/or Izod impact resistance (IR). For example, the IR characterizing the core can be lower than the IR characterizing the shell, and the HDT characterizing the core is can be higher than the HDT characterizing the shell. In this embodiment, the high HDT core induces high temperature resistance and the high IR of the shell imparts toughness to the entire object produced with such core-shell structure and materials. Optionally and preferably both relations are fulfilled for the same structure, namely the IR value is lower for the core region than for the shell, but the HDT is higher for the core region than for the shell.

As used herein, the term "heat distortion temperature" (HDT) refers to a temperature at which the respective material or combination of materials deforms under a predetermined load at some certain temperature. Suitable test procedures for determining the HDT of a material or combination of materials are the ASTM D-648 series, particularly the ASTM D-648-06 and ASTM D-648-07 methods. In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

As used herein, the term "Izod impact resistance" refers to the loss of energy per unit of thickness following an impact force applied to the respective material or combination of materials. Suitable test procedures for determining the Izod impact resistance of a material or combination of materials are the ASTM D-256 series, particularly the ASTM D-256-06 series. In some embodiments of the present invention the core and shell of the structure differ in their Izod impact resistance value as measured by any method of the ASTM D-256-06 series. It is noted that in the standard ASTM methods there is need to machinate a notch. However, in many cases, this process cuts the shell and exposes the core to the notch tip. Therefore, this standard method is less preferred for evaluating the impact resistance of a structure built according to some embodiments of the present invention. Preferred procedures for determining the impact resistance will now be described. These procedures are particularly useful when the SFF includes comprises three-dimensional printing.

According to a first procedure, a test specimen is printed with a rectangular patch made of the shelling material. The dimensions of the patch are calculated in such way that after the notch preparation (as required by the standard ASTM procedure) a 0.25 mm layer of the shelling material remains complete.

According to a second procedure, a test specimen is printed with notch instead of cutting the notch after the specimen is printed. The orientation of the specimen on the tray is vertical, for example, in the Z-Y plane (referred to herein as "orientation F").

Representative ranges for IR values suitable for some embodiments of the present invention, include, without limitation, about 20 J/m for the core, and about 40 J/m for the shell. Representative ranges for heat distortion temperatures suitable for some embodiments of the present invention, include, without limitation, about 50° C. for the core and about 70° C. for the shell.

In some embodiments of the present invention the core is made of a material characterized by a HDT at pressure of 0.45 MPa which is from about 40° C. to about 50° C. A representative example of a modeling material having such thermal properties is a modeling material marketed by Objet Geometries under the trade name VeroGray™. In some embodiments of the present invention the shell is made of a material characterized by an IR value of from about 40 J/m to about 50 J/m, e.g., about 40 J/m. A representative example of a modeling material having such thermal properties is a modeling material marketed by Objet Geometries under the trade name DurusWhite™.

In some embodiments of the present invention both the core and the shell are rubber-like materials.

As used herein, the term "rubber-like material" refers to a material which is characterized by Tg which is significantly lower than room temperature. For example Tg of about 10° C. or less.

When the core and shell are made of a rubber-like material, the core material may have a lower elongation at break value $\epsilon_R$ than the shell material, e.g. $\epsilon_R > 1\%$. Preferably, there is a difference of at least 30% or at least at least 60% or at least 90% or at least 120% between the $\epsilon_R$ of the core and the $\epsilon_R$ of the shell. For example, when the core has an $\epsilon_R$ value of 50% the shell has an $\epsilon_R$ value which is at least 30% larger, namely an $\epsilon_R$ value of 80% or more. Typically, but not necessarily, the $\epsilon_R$ value of the shell is at least 100%.

In some embodiments of the present invention the core is made of a material characterized by TR of from about 2 Kg/cm to about 12 Kg/cm, e.g., about 4 Kg/cm or about 10 Kg/cm, and an $\epsilon_R$ value of from about 45% to about 50%. In some embodiments, the material also possesses one or more of the following properties: tensile strength of from about 1 MPa to about 5 MPa, e.g., about 2 MPa or about 4.36 MPa, and glass transition temperature from about −12° C. to about 4° C., e.g., about −10.7° C. or about 2.6° C. Representative examples of modeling materials having such thermal properties are modeling materials marketed by Objet Geometries under the trade names TangoBlack™ and TangoGray™.

In some embodiments of the present invention the shell is made of a material characterized by TR from about 2 Kg/cm to about 4 Kg/cm, e.g., about 3 Kg/cm, and an $\epsilon_R$ value from about 200% to about 236%. In some embodiments, the material also possesses one or more of the following properties: tensile strength of from about 1 MPa to about 2 MPa, and glass transition temperature from about −12° C. to about −8° C. Representative examples of modeling materials having such thermal properties are modeling materials marketed by Objet Geometries under the trade names TangoBlack Plus™ and Tango Plus™.

The modeling material can be a material contained in a particular container or cartridge of a solid freeform fabrication apparatus or a combination of modeling materials deposited from different containers of the apparatus. The modeling materials from which the core and the shell of the present embodiments are formed, may, by themselves, have the desired thermal and mechanical properties, according to one or more of the embodiments described above. This, however, need not necessarily be the case since the Inventors of the present invention have devised a technique for obtaining the desired properties from a combination of materials. This technique will now be explained.

Suppose, for example, that it is desired to have a core having a desired HDT. Suppose further that there is a commercially available modeling material, denoted material A, which has an HDT which is more than the desired HDT, and another commercially available modeling material, denoted material B, which has a HDT which is less than the desired HDT. According to some embodiments of the present invention the core is formed from both these materials, wherein for each layer of the structure, materials A and B are interlaced over the core region of the layer in a pixelated manner, such as to provide a combination which is characterized by the desired HDT. Thus, rather than mixing the material in advance using the mixture for forming the layer, the materials A and B occupy different spatial locations which are laterally displaced from each other over the core region of the layer, wherein the elementary displacement unit of each of the materials is a single pixel (or voxel to denote a 3 dimensional pixel). Such combination is referred to as digital material (DM). A representative example of a digital material is illustrated in FIG. 3, showing materials A and B which are interlaced over a region of a layer in a pixelated manner.

As a representative example, consider a material A characterized by HDT of about 40° C. and a material B characterized by HDT of about 75° C. When materials A and B are deposited at a relative surface density ratio of A:B=3:1, namely three pixels of material A for each pixel of material B, a DM characterized by HDT of about 50° C. can be obtained. For any predetermined surface density ratio of the materials, a digital material can be formed for example, by ordered or random interlacing. Also contemplated are embodiments in which the interlacing is semi-random, for example, a repetitive pattern of sub-regions wherein each sub-region comprises random interlacing.

While the embodiments above were described with a particular emphasis to a DM for the core of the structure, it is to be understood that more detailed reference to the core is not to be interpreted as limiting the scope of the invention in any way. Specifically, any of the core and the shell can be formed from a DM.

When both the core and shell are made of a DM composed of the same modeling materials, the relative surface density of any of the modeling materials in the core is different from the relative surface density of that material in the shell or envelope region. In some embodiments, however, the core is formed from a DM and the shell is formed of a single modeling material or vice versa.

In various exemplary embodiments of the invention the thickness of the shell, as measured in the x-y plane (perpendicularly to the build direction z) is non-uniform across the build direction. In other words, different layers of the structure may have envelope regions of different widths. For example, the thickness of the shell along a direction parallel to the x-y plane can be calculated as a percentage of the diameter of the respective layer along that direction, thus making the thickness dependent on the size of the layer. In various exemplary embodiments of the invention the thickness of the shell is non-uniform across a direction which is tangential to the outer surface of the shell and perpendicular to the build direction. In terms of the structure's layers, these embodiments correspond to an envelope region having a width which is non-uniform along the periphery of the respective layer.

In some embodiments of the present invention the shell of the structure, or part thereof, is by itself a 'shelled' structure, comprising more than envelope region. Specifically in these embodiments, the structure comprises an inner core, at least partially surrounded by at least one intermediate envelope region, wherein the intermediate envelope(s) is surrounded by an outer envelope region. The thickness of the intermediate envelope region(s), as measured perpendicularly to the build direction, is optionally and preferably larger (e.g., 10 times larger) than the thickness of the outermost envelope region. In these embodiments, the intermediate envelope region(s) serves as a shell of the structure and therefore has the properties of the shell as further detailed hereinabove. The outermost envelope shell may also serve for protecting the intermediate envelope(s) from breakage under load.

It was found by the present inventors that irregularity at the outermost interface of the intermediate envelope region and the outermost envelope may cause the appearance of cracks under load, such cracks spread into the shell and possibly into the core. In various exemplary embodiments of the invention the outermost envelope provides a protective covering to prevent or reduce propagation appearance cracks at the interface between the intermediate envelope and the outermost envelope regions. The outermost envelope can also function to dissipate cracks starting at the outermost envelop-air interface. It was also found by the present inventors that while the capability of outermost envelope to impede cracks appearance at the envelope-envelop interface is related to the envelope-envelope materials moduli ratio, the capability of the outermost envelope to withstand crack propagation from the envelope-air interface, is related to the outermost envelope toughness. Thus, denoting the elastic modulus of the outermost envelope by $\epsilon_1$, and the elastic modulus of the next-to-outermost envelope by $\epsilon_2$, according to some embodiments of the present invention the ratio $\epsilon_2/\epsilon_1$ is from about 1.3 to about 5, and the impact resistance of the outermost envelope is at least 40 J/m or at least 50 J/m or at least 60 J/m or at least 70 J/m, e.g., about 80 J/m or more.

The structure of the present embodiments can be formed, as stated, in a layerwise manner, for example, using system 10 described above. In various exemplary embodiments of the invention a computer implemented method automatically performs dynamic adaptation of the shell to the specific elements of the structure. The method can optionally and preferably employ user input to calculate the shell for each region of the structure and assigns the voxels of the outer surfaces to the respective modeling material or combination of modeling materials. The computer implemented method can be executed by a control unit which controls the solid freeform fabrication apparatus (e.g., control unit 52, see FIG. 1) via a data processor (e.g., data processor 54).

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The computer implemented method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Figure 4A:
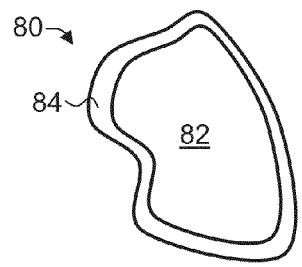

FIG. 4A illustrates a single layer 80 which can be formed during the fabrication process. Layer 80 comprises a core region 82 and an envelope region 84 which surrounds core region 82. Thus, region 82 contributes to the core of the structure and region 84 contributes to the shell of the structure, since when several layers similar to layer 80 are deposited one over the other, the core regions form a layered core and the envelope regions form a layered shell.

Figure 4B:
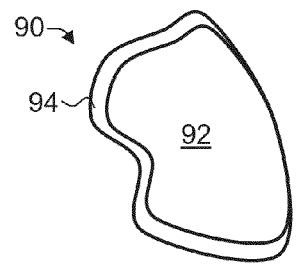

FIG. 4B illustrates another layer 90 which can be formed during the fabrication process. Layer 90 comprises a core region 92 and an envelope region 94 which only partially surrounds core region 92. When the structure comprises one or more layers similar to layer 90 the formed shell does not completely surround the core.

Figure 4C:
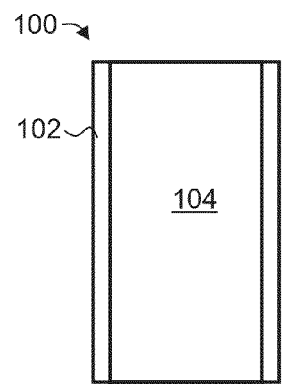

As illustrated in FIGS. 4A and 4B, the widths of the envelope regions 84 and 94 is non-uniform over the periphery of the layers. A representative example of a layer 100 with a uniform width of an envelope region 102 surrounding a core region 104 is illustrated in FIG. 4C. Such layers are also contemplated by the present inventors.

Figure 4D:
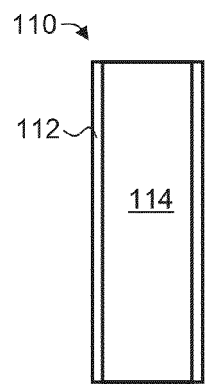
Figure 4E:
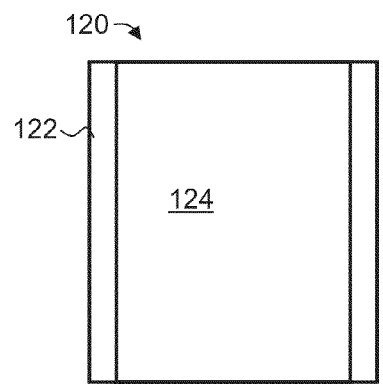

The widths of the envelope region, as stated, can vary across the build direction of the structure. FIGS. 4D and 4E illustrate two layers, 110 and 120, corresponding to different locations along the build direction. Layer 110 (FIG. 4D) has a core region 114 surrounded by an envelope region 112, and layer 120 (FIG. 4E) has a core region 124 surrounded by an envelope region 122.

Once the layers of the structure are formed, the modeling materials forming the core and envelope region are hardened such as to bind a circumference of the core region to a circumference of said envelope region.

In some embodiments of the present invention one or more additional shell layers are dispensed so as to form a shell also at the top most and/or bottom most parts of the structure. These layers are preferably devoid of a core region since they serve for shelling the core from above or from below. When it is desired to shell the core from above, the additional shell layer(s) are dispensed on top of all other layers, and when it is desired to shell the core from below, the additional layer(s) are dispensed on the working surface (e.g., tray 30, see FIG. 1) while all other layers are dispensed thereafter.

Any of the envelope regions optionally has a width of at least 10 μm. Preferably, all the envelope regions have a width of at least 10 μm.

Any of the core and envelope regions, and optionally also the top most and/or bottom most additional layers, may be fabricated using modeling materials or combinations of modeling materials (e.g., digital materials) having thermal and/or mechanical properties as described above with respect to the core and the shell of the structure.

Thus, in some embodiments the ratio between the elastic moduli of the core and envelope regions, when hardened, is from about 1.3 to about 20; in some embodiments the characteristic $T_g$ or HDT of the core region is below about 50° C. and the characteristic $T_g$ or HDT of the envelope region is above about 50° C.; in some embodiments the characteristic $\epsilon_R$ value of the core region is lower than the characteristic $\epsilon_R$ value of the envelope region, when hardened; in some embodiments the characteristic TR value of the core region is lower than the characteristic TR value of the envelope region, when hardened; in some embodiments the characteristic IR value of the core region is lower than the characteristic IR value of the envelope region; and in some embodiments the characteristic HDT of the core region is higher than the characteristic HDT of the envelope region.

In some embodiments of this invention, the shell is fabricated selectively in different regions of the structure so as to change the material properties only in selected regions areas without affecting the mechanical properties of other regions.

It is expected that during the life of a patent maturing from this application many relevant modeling materials for SFF will be developed and the scope of the term modeling material is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

A study of the effect and properties of different modeling materials was conducted by the present Inventors.

FIG. 5 shows results of experiments demonstrating the inverse relationship between HDT and impact resistance in several modeling materials. The modeling materials presented in FIG. 5 are commercially available modeling materials marketed by Objet Geometries Ltd., Israel. This relationship demonstrates the findings of the present inventors that there is a tradeoff between the two properties and that a material displaying such predetermined thermo-mechanical property combination is rarely attainable in commercially available material.

The present inventors have analyzed several combinations of materials in terms of three attributes: form, fit and function.

For rigid materials, the present inventors found that a moderate $T_g$ or HDT and tough material can provide a solution for the function, while impairing the other attributes (form and fit), due to the environmental deformations characteristic of such $T_g$ materials, for example material creep. The present inventors found that tough materials provide solutions for robust geometries or structure that are not exposed to warm environments, but do not provide an adequate solution for other structures. The present inventors further found that a high $T_g$ and brittle material may fail in functional applications requiring flexibility or impact resistance, but provides satisfactory results in terms of the form and fit attributes. Materials with even higher $T_g$ (e.g., above 50° C.) are even more brittle and with significant curling like distortions during printing.

For rubber like materials, the present inventors found that although materials with high elongation are already available, these materials do not have good elastomer properties but rather a combination between elastic and plastic behavior. The present inventors found that other materials, with a more elastomer-like behavior, may be too brittle (low tear strength) to be used for applications requiring standard rubber materials.

In experiments performed by the present inventors, objects with several core-shell structures have been fabricated by SFF. The structures benefited from improved properties. For example the present inventors successfully fabricated a rigid structure with a combination of moderate HDT and high toughness, a rigid structure with a combination of temperature resistance (for example high HDT) and reduced curling, a rigid structure with a combination of high HDT and significantly improved toughness, a rigid structure with a combination of high HDT, reduced curling and significantly improved toughness, and a rubber-like structure with a combination of high elongation to break, fast return after deformation and tunable modulus.

A rigid structure material with a combination of moderate HDT and high toughness, can be obtained by fabricating core-shell structure in which the shell has high toughness which prevented cracks propagation from the surface toward the core. The core can be made from a material having moderate HDT but relatively high brittleness. The thickness of the shell can be selected to reduce its effect on the overall mechanical properties beside toughness. For example, the thickness can be between 0.17 mm and 0.34 mm in thickness in a direction normal to the object surface.

A rigid structure with a combination of high HDT and reduced curling can be obtained by fabricating core-shell structure in which the shell which comprises a high $T_g$ or high HDT material. The shell provides to the structure with high HDT and reduced creep over time or at elevated temperatures. The thickness of the shell depends on the HDT and curling behavior of the core or intermediate shells (if existed), and the desire behavior of the structure. Typically, but not necessarily, a material having HDT of about 75° C. can be used for fabricating a shell of 0.5 mm-1.0 mm in thickness. The core can comprise a material with a moderate HDT (typically, but not necessarily from about 45° C. to about 50° C.) which does not cause significant curling during SFF process. Each of the shell and core can be made of a digital material as further detailed hereinabove. For example, the core can be made using surface density ratio of 3:1 between a modeling materials with HDT of 40° C. and modeling materials with 75° C., respectively, to provide a DM with HDT of about 50° C. and a curling of less than 3.5 mm when printing, e.g. a 10×10×230 mm beam.

A rigid structure with a combination of high HDT and significantly improved toughness can be obtained by fabricating a core-shell structure in which the shell comprises a high toughness material which protects the core and intermediate shells (if existing) from breakage under load. The thickness of the shell can be selected to be sufficiently small so as to reduce its effect on the overall mechanical properties beside toughness. Typically, but not necessarily the thickness of the shell can be from about 0.17 mm to about 0.34 mm The core can comprise a high $T_g$ or high HDT material. The core provides the structure with high HDT and reduced material creep over time or at elevated temperatures.

A rigid structure with a combination of high HDT, reduced curling and significantly improved toughness, can be obtained with a structure having a core, an intermediate shell and an outermost shell. The outermost shell can comprise a high toughness material. The role of this shell is to protect the intermediate shell (and therefore the core as well) from failure upon loading (e.g., break). The intermediate shell can comprise a high $T_g$ or high HDT material. This shell provides the structure with high temperature resistance and reduced creep over time or at elevated temperatures. The thickness of the intermediate shell depends on the HDT and curling behavior of the core, and the desired behavior of the structure. Typically, but not necessarily, a material having HDT of about 75° C. can be used for fabricating an intermediate shell, e.g., 0.5 mm-1.0 mm in thickness. The core can comprise a moderate HDT material (e.g., HDT of from about 45° C. to about 50° C.) and moderated low curling behavior (e.g., curling below 4 mm wherein the curling is defined as the elevation of the edge of a printed 10×10×230 mm beam above a flat surface when a 300 g load is applied to its opposite edge). The core can be formed of a DM mix of a high HDT modeling material (e.g., HDT of from about 75° C. to about 200° C.) with a moderated low HDT modeling material (e.g., HDT of from about 25° C. to about 45° C.). The surface density ratio can be selected depending on the desired HDT and curling properties.

A rubber-like structure with a combination of high elongation to break, fast return after deformation and tunable modulus can be obtained by fabricating a core-shell structure in which the shell comprises a high elongation material which prevents or reduces cracks from propagating from the surface. The shell protects the inner core and intermediate shells (if existing) from failure upon loading. The thickness of the shell can be selected to be sufficiently small so as to reduce its effect on the overall mechanical properties aside from preventing crack propagation. Typically, but not necessarily, the thickness of the shell is from about 0.17 mm to about 0.34 mm. The core can comprise a material or combination of materials (e.g., a digital material) with the desired tensile and compression modulus, fast return time after deformation, but lower elongation to break when compared to the shell.

When fabricating a structure via SFF, a performance inconsistency is oftentimes observed. It is mainly expressed when considering the material's toughness, which may vary significantly from one fabricated structure to the other and also among different regions of the same structure (e.g., the core and the shell). The reason for this lies in the layerwise fabrication process. In ink-jet based 3D printers, for example, the layerwise fabrication process may result in a different surface morphology in the build direction as well as in the lateral planes (parallel to printing tray). The vertical sides of the structure may contain microscopic surface cracks with sharp tips (FIG. 6) that significantly reduce the toughness of the fabricated structure. In certain structures, the mechanical parameters, such as deflection to break, maximal load at break and strength may be reduced by a factor of 10 to 20. This is demonstrated in FIGS. 7A and 7B which show deflection at break and maximal load at break of beams printed using a FullCure®535 modeling material. The graphs show the deflection at break ("deflection") and maximal load ("max load") as a function of the angle between the printed beam and the x-y plane.

When a structure is fabricated while keeping the outer surface in a liquid form at some stage of the fabrication and not in contact with any other material, gravitation and wetting cause the liquid resin to flow, thus smoothing the surface of the structure. This can be realized in positive angled surfaces (up or out facing surfaces). For other angles (down-facing surfaces), the addition of a support material or support construction is required to avoid structure collapse. It was found by the present inventors that the contact between the modeling and support materials results in a cracked surface morphology that significantly reduces the overall toughness of the structure. Such roughness in the surface generates anisotropy in the properties of the structure, for example, anisotropic flexural modulus, or anisotropic resistance to scratching. Another effect of the roughness is the increase in brittleness, which can be manifested by low impact resistance and lower elongation/deflection at break.

Following is a description of experiments performed by the present inventors to study the properties of core-shell structures of the present embodiments.

Materials

Commercially available modeling materials of Objet Geometries Ltd. were used in the experiments. These materials cover a range of properties. For example, VeroGray™ is a rigid modeling material and TangoPlus™ (Tango+) is a soft, rubber-like modeling material. The materials FullCure®535 (FC535), otherwise known as RGD535, and FullCure®515 (FC515), otherwise known as RGD515, broaden the range of available properties, and are dedicated to the multiple material Connex™ platform of Objet Geometries and are typically used in combination with the other. Other materials used in the present study include VeroGray™, DurusWhite™, FullCure®970 (TangoBlack™), and FullCure®980 (Tango-Black Plus™)

In experiments in which post-printing shelling was employed as a comparative study, standard resins, additive manufacturing tempering materials, epoxy and silicon A+B resins were used, for example, RP Tempering™ Compound (Par3 Technology, USA), and manual coating (using a brush) with FC515 followed by curing in UV chamber.

In the following, the term high impact material (HIM) will be used to describe a tough material with good impact resistance (e.g., FC515), and the term High $T_g$ material (HTM) will be used to describe a stiff material with high $T_g$ and high HDT (e.g., FC535).

Software

Software was developed in order to provide the ability to design and test different spatial arrangements of two different modeling materials and one support material. The software also provided ability to design different Digital Materials. In addition the software included a shelling feature which allowed defining of a precise (deviations vary from ±0.03 mm to ±0.08 mm, depending on the spatial orientation of the specific surface) shell of predetermined thickness. The software also included a multi-shelling feature which allowed defining one or more shell layers.

The software also included a random DM generator which allowed generating random bitmaps (random combination of two and more modeling materials). This provided an easy and straightforward tool for creating a range of homogeneous DMs, whose properties may change, essentially, continuously.

Solid Freeform Fabrication Apparatus

A standard Connex™ 500 printer (Objet Geometries) was used to print all materials and structures.

Printing Modes

The experiments included fabrication of matte surfaces as well as glossy surfaces.

Matte surfaces were fabricated by printing modeling materials in contact with support material. In such case and due to the fact that both liquids come in contact before solidification, they partially mix at the interface and as a result, upon removing the support material a matte surface is obtained. The matte printing mode resulted from an object completely covered by support material, and not only in regions which needed mechanical support before solidification (e.g., regions near voids).

Glossy surfaces were fabricated by printing modeling materials which were not in contact with any other material, aside from the air. The glossy printing mode resulted in a smooth shiny gloss surface. Note that while a matte surface can be obtained for the entire surface of the structure, a glossy surface can be obtained only for surfaces that do not demand to be in contact with support material.

Tests

Print deformations (curling) were quantitatively assessed by printing a 10×10×230 mm³ bar and measuring the elevation of one specimen extreme above a flat surface, while applying 300 gr weights on the other specimen extreme. For this study an elevation of 4 mm or less was considered as acceptable for most mainstream applications.

Several applicative tests were developed in order to evaluate new materials' performance. Standard ASTM methods and self-defined methods were implemented to characterize the pure components and DM structures.

Results

Structures with High Thermal Stability and High Toughness

The development of a high $T_g$ material was aimed to provide materials having HDT above 70° C. and exhibiting relatively low print deformations (low curling), i.e. below 10 mm The formulation FC535 has a $T_g$ of 65° C. and HDT of 70° C. Table 1 below shows the properties of the FC535.

TABLE 1

| FC535 Data Sheet | |
|---|---|
| Izod impact resistance (J/m) | 15-20 |
| HDT (C.) | 63-78 |
| Tensile strength (MPa) | 70-75 |
| Strain at break (%) | 7-9 |
| Tensile Modulus (MPa) | 3300-3500 |
| Flexural strength (MPa) | 110-120 |
| Flexural Modulus (MPa) | 3000-3150 |
| Tg (DMA, E") | 65 |
| Water Absorption (%) | 1.3 |

The print deformation (curling) of this material was 7.5 mm, which is higher than the maximal accepted value. A post curing process at relatively low temperatures (below 100° C.) boosted the HDT of the FC535 to about 100° C. without increasing deformations.

The next experiment was aimed to endow the FC535 with toughness. Amorphous HTM (such as FC535) has low impact resistance and is very brittle, similarly to other commercially available rigid materials. The brittleness is amplified in parts of structures that are in direct contact with support material, and are subjected to stress in parallel to their vertical printing plane. Such stress actually separates the edges of the cracks and causes failure at relatively low strain.

A series of tests were designed in order to quantitatively evaluate the brittleness of the materials and its expression.

Impact Resistance (i) Standard notched specimens, printing rectangular specimens and cutting notch thereafter (ASTM D256).

(ii) Printing specimens with notch in different orientations

Tensile Test

Measuring percent elongation at break (ASTM D638)

Resistance to Bending (i) Three-point bending (flexural) test on specimens printed in different orientations (ASTM D695)

(ii) Anchored beam bending.

Additional tests included snap test, cyclic test, ball and claw structure test, and spring structure test. The specimens for these tests are shown in FIGS. 8A-D, respectively.

Table 2, below shows properties of 3 modeling materials used in various combinations to produce a digital material for the above tests.

TABLE 2

| | FC535 | FC515 | DurusWhite ™ |
|---|---|---|---|
| Impact resistance (J/m) | 15 | 90 | 41 |
| HDT (C.) | 70 | 37 | 41 |
| Tensile strength (MPa) | 70 | 21 | 30 |
| Strain at break (%) | 8 | 90 | 38 |
| Tensile Modulus (MPa) | 3500 | 1100 | 1500 |
| Water absorption (%) | 1.3 | 6.6 | 1.7 |

The material that is located on the tip of an Izod notch strongly influences the measured impact values. This behavior was explicitly expressed when a tough material, e.g., FC515 specimens having impact of about 90 J/m (printed notch, glossy) were printed with outer shelling layers made of high $T_g$ FC535 material that has an impact resistance of about 30 J/m in the same conditions. Surprisingly, even addition of the smallest possible FC535 envelope layer, which is about 100 μm, reduced the impact resistance to below 30 J/m.

The above experiments demonstrated that the composition of the outermost surface determines the impact properties of the structure.

Print Orientations

Print orientations refer to the orientation of objects being fabricated relative to the printing surface (printing tray). FIG. 8E shows various different orientations as referred to herein.

Structures made of FC535 and FC515

A shell made of HIM (FC515, in the present example) of about 0.25 mm in width, which may be about 20% of the total cross-section (3×12.7 mm) of a structure, and a core made of FC535. While the tensile strength and modulus are reduced after the introduction of HIM shelling by less than 10%, the strain at break increased from about 10% to more than 35%. It is assumed by the present inventors that the HIM shell shields the article from surface defects (especially in matte surfaces) which otherwise will have a destructive effect. Table 2a below summarizes the impact resistance at orientation F for the various fabricated specimens.

TABLE 2a

| Specimen structure | Impact (J/m) | St. Dev. |
|---|---|---|
| FC535 reference | 14.35 | 0.55 |
| FC535 with 0.085 mm FC515 shell | 15.90 | 0.58 |
| FC535 with 0.17 mm FC515 shell | 21.70 | 3.37 |
| FC535 with 0.25 mm FC515 shell | 42.97 | 4.53 |
| FC535 with 0.34 mm FC515 shell | 46.50 | 1.60 |
| FC535 with 0.43 mm FC515 shell | 47.13 | 1.95 |
| FC535 with 0.5 mm FC515 shell | 50.09 | 1.13 |
| FC515 reference | 90.46 | 6.62 |

FIG. 8F shows results of a tensile test of FC535 with 0.25 mm FC515 shell vs. FC535 without shell. As shown, shelling with FC515 significantly improves the toughness of stiff material FC535, by increasing its elongation at break from about 10% to about 40%, while reducing its elastic modulus by only about 15%.

Bending Test

The bending test was used mainly for simulation of snap applications. In these applications a thin beam is deflected and rapidly returns to its initial position. Therefore, two relevant parameters were measured: the maximal bending deflection before break and the resistance to bending (maximal load). The desired property for this type of application is stiffness with high deflection to break. The specimen for the bending test was printed in different orientations, print modes and with different beam widths. The bending test and the specimen tested are shown in FIGS. 8A and FIGS. 9A-C.

Tables 3 and 4, below and FIGS. 10A-B summarize the performance of 1 mm, 2 mm and 3 mm FC535 beams printed and tested with and without a FC515 shell in three different events.

TABLE 3

Bending of 1 mm, matte, orientation E beams

| Core | Shell material | Thickness (mm) | Max Load (N) | Deflection (mm) |
|---|---|---|---|---|
|  | FC535 |  | 45.50 | 0.60 |
| FC535 | FC515 | 0.085 | 38.40 | 0.60 |
| FC535 | FC515 | 0.17 | 33.70 | 1.50 |
| FC535 | FC515 | 0.25 | 22.30 | 2.40 |
|  | FC535 Glossy |  | 91.80 | Not break |

TABLE 4

Bending of 3 mm, matte, orientation E beams

| Core | Shell material | Thickness (mm) | Max Load (N) | Deflection (mm) |
|---|---|---|---|---|
|  | FC535 |  | 176.10 | 1.20 |
| FC535 | FC515 | 0.085 | 168.20 | 1.20 |
| FC535 | FC515 | 0.17 | 209.40 | 2.20 |
| FC535 | FC515 | 0.25 | 215.30 | 3.60 |
|  | FC535 Glossy |  | 383.30 | 4.60 |

The above results demonstrate that the addition of an 85 micron shell has less than optimal results. It is assumed that this is because the layer is converted into a model-support mix layer when printed in matte.

When the shell thickness was increased to 170 microns a significant effect on elongation was observed. The maximal load was also increased in the case of 3 mm beams (synergistic effect).

For a 250 micron shell, the fabricated beams had high flexibility, but the 1 mm beam became somewhat softer.

In both beam widths the glossy FC™535 specimens displayed superior performance even without a shell. This fact emphasizes the role of surface defects. In the absence of such defects stiff materials have good toughness. However, in presence of defects the stiff materials become brittle, while the HIM remains tough. The surface modification with HIM impedes defects in the material so that it is less sensitive to crack propagation. In other words, the surface modification maintains the surface defects within the HIM, thereby preventing them from propagating The effect of surface defects was further investigated by printing the beam test specimens in different orientations. The results are summarized in Table 5, below. In orientation E, where the direction of the most severe defects is parallel to the bending stress beam, the elongation to break is lowest. In orientation D, the cracks are perpendicular to the stress therefore less affecting brittleness. The experimental data collected by the present inventors show that in the D orientation even a shell of 1 pixel has a significant effect. All tests made with orientation D were superior relative to orientations E and F.

TABLE 5

Bending of 3 mm, matte beams

|  | Max Load (N) | Deflection (mm) |
|---|---|---|
| Orientation F |  |  |
| Snap 0.8 mm with 1 px shell | — | — |
| 0.8 mm reference | 9.70 | 0.40 |
| Snap 1.6 mm with 3 px shell | 80.70 | 1.20 |
| 1.6 mm reference | 55.50 | 0.30 |

TABLE 5-continued

Bending of 3 mm, matte beams

|  | Max Load (N) | Deflection (mm) |
|---|---|---|
| Orientation D | | |
| Snap 0.8 mm with 1 px shell | 30.00 | 3.20 |
| 0.8 mm reference | 36.20 | 1.60 |
| Snap 1.6 mm with 3 px shell | 120.70 | 2.40 |
| 1.6 mm reference | 171.10 | 1.10 |
| Orientation E | | |
| Snap 0.8 mm with 1 px shell | 13.50 | 0.71 |
| 0.8 mm reference | 12.70 | 0.48 |
| Snap 1.6 mm with 3 px shell | 123.40 | 1.00 |
| 1.6 mm reference | 63.40 | 0.48 |

In other comparative tests the influence of high resolution print mode was investigated. The tests were performed on 2 mm beams made of a brittle (FC535) and a high impact material (FC515) with a shell of 0.25 mm HIM specimens printed in orientation E in glossy and in matte. The results are shown in FIG. 11.

The results of the cyclic snap test and snap parts test are summarized in Tables 6 and 7, below.

TABLE 6

| Insert diameter (mm) | 1 39.6 | 2 40 | 3 40.4 | 4 40.8 | 5 41.2 | 6 41.6 | 7 42 | 8 42.4 | 9 42.8 | Max Load (N) |
|---|---|---|---|---|---|---|---|---|---|---|
| FC535_0.17 mm_FC515 | pass | pass | pass | pass | fail | fail | fail | fail | fail | 260 |
| FC535_0.25 mm_FC515 | pass | pass | pass | pass | pass | fail | fail | fail | fail | 240 |
| FC535 | fail | fail | fail | fail | fail | fail | fail | fail | fail | — |
| Vero | fail | fail | fail | fail | fail | fail | fail | fail | fail | — |
| Water Shed | pass | pass | pass | pass | fail | fail | fail | fail | fail | 185 |
| Durus | pass | pass | pass | pass | pass | pass | pass | pass | pass | 230 |

TABLE 7

| | Shell (μm) | Spring | Ball and claw |
|---|---|---|---|
| Reinforcer with FC515 shell | No shell | fail | Fail |
| | 85 | fail | Fail |
| | 170 | fail | Fail |
| | 250 | pass | Pass |
| | 340 | pass | Pass |
| Reference materials | Vero | | Fail |
| | Durus | | Pass |
| | Water Shed* | fail | Pass |

Improving the Toughness of VeroGray™ by Thin Shelling with DurusWhite™

VeroGrey™ (VG) exhibits on of the highest dimensional stabilities at elevated temperatures (low material creep) amongst the modeling materials currently available from Objet Geometries Ltd. On the other hand, VG is the most brittle material.

DurusWhite™ (DW) has amongst the highest toughness and impact resistance among the modeling materials available from Objet Geometries Ltd.

The present inventors have demonstrated that a combination of VG and DW can be used to produce structures characterized by HDT that is similar to VG and toughness that is similar to DW. In some configurations a synergistic effect was observed and the toughness of the composite, shelled part is higher than that of the pure VG or pure DW. The experimental data is summarized in Tables 8-12.

TABLE 8

HDT Test: HDT at 0.45 MPa (ASTM D648)

| Core material | Shell material | Shell thickness (mm) | HDT (C.) | St. Dev. |
|---|---|---|---|---|
| | Pure VG reference | | 51.0 | 0.2 |
| VG | DW | 0.085 | 50.2 | 0.4 |
| VG | DW | 0.17 | 50.0 | 0.4 |
| VG | DW | 0.25 | 49.7 | 0.5 |
| VG | DW | 0.34 | 49.8 | 0.4 |
| | Pure DW reference | | 40.1 | 0.1 |

TABLE 9

Impact resistance test: specimens were printed with notch in vertical orientation, and measured according to modified ASTM D256

| Core material | Shell material | Shell thickness (mm) | Izod impact resistance (J/m) | St. Dev. |
|---|---|---|---|---|
| | Pure VG reference | | 14.9 | 0.3 |
| VG | DW | 0.085 | 15.5 | 1.1 |
| VG | DW | 0.17 | 15.2 | 1.0 |
| VG | DW | 0.25 | 15.8 | 1.4 |
| VG | DW | 0.34 | 17.2 | 1.6 |
| VG | DW | 0.43 | 18.2 | 1.2 |
| VG | DW | 0.50 | 19.1 | 1.0 |
| | Pure DW reference | | 18.3 | 1.4 |

TABLE 10

$K_IC$ test (ASTM D5045). The shell thickness represents the initial layer, before notching with knife. The knife notch depth was about 0.2 mm.

| Core material | Shell material | Shell thickness (mm) | $K_IC$ (MPa/m) | St. Dev. |
|---|---|---|---|---|
| | Pure VG reference | | 0.76 | 0.05 |
| VG | DW | 0.34 | 1.37 | 0.21 |
| VG | DW | 0.50 | 1.44 | 0.25 |
| | Pure DW reference | | 1.15 | 0.04 |

TABLE 11

Snap test: bending of anchored 1 mm beams, while
measuring deflection at break and maximal load.

| Core material | Shell material | Shell thickness (mm) | Max Load (N) | St. Dev. | Deflection at break (mm) | St. Dev. |
|---|---|---|---|---|---|---|
| Pure VG reference | | | | | Break before test | |
| VG | DW | 0.085 | 17.6 | 2.4 | 1.00 | 0.20 |
| VG | DW | 0.17 | 17.7 | 0.2 | 1.08 | 0.06 |
| VG | DW | 0.25 | 19.0 | 2.0 | 1.40 | 0.17 |
| VG | DW | 0.34 | 18.5 | 1.9 | 2.20 | 0.30 |
| Pure DW reference | | | 13.2 | 1.0 | 2.30 | 0.10 |

TABLE 12

Same as Table 11, but for 3 mm beams

| Shell material | Shell material | Shell thickness (mm) | Max Load (N) | St. Dev. | Deflection at break (mm) | St. Dev. |
|---|---|---|---|---|---|---|
| Pure VG reference | | | 103 | 10.0 | 1.35 | 0.10 |
| VG | DW | 0.085 | 114 | 11.9 | 1.50 | 0.17 |
| VG | DW | 0.17 | 142 | 4.6 | 3.00 | 0.40 |
| VG | DW | 0.25 | 134 | 8.8 | 2.30 | 0.40 |
| VG | DW | 0.34 | 130 | 5.5 | 3.90 | 1.20 |
| Pure DW reference | | | 53.6 | 4.0 | Not break | |

Tables 9, 10 and 11 demonstrate a synergistic effect wherein the Izod impact resistance, $K_fC$ and Max. Load properties are higher than any of the pure materials that were used. Specifically, the measured Izod impact resistance (19.1, see Table 9) is higher than that of pure VG (14.9) and pure DW (18.3), the measured $K_fC$ values (1.37; 1.44, see Table 10) is higher than that of pure VG (0.76) and pure DW (1.15), and the measured Max. Load value (19.0, see Table 11) is higher than that of pure VG (too low for measuring) and pure DW (13.2).

Rubber Digital Material

Cores made of FullCure®970 (TangoBlack™) and cores made of FullCure®970 (TangoGrey™) were enclosed by shells made of FullCure980 (TangoBlack Plus™) and shells made of FullCure®930 (Tango Plus™). The shell thickness was about 0.25 mm The tensile stress as a function of the tensile strain of the resulting structures and pure material structure references is shown in FIGS. 12A-B. As shown, the strength of the resulting shelled structure is much higher than the strength of the separate components comprising it. While a shell of FullCure®930 and a core of FullCure®970 result in higher elongation and higher strength than FullCure®930, the opposite result in very inferior results. As FullCure®930 has rather a more plastic behavior than FullCure®970, making the shell with FullCure®930 result a material with most of the properties of FullCure®970 (the core material) but with significantly improved elongation and strength at break.

Discussion

As the shell in many cases consists of only a very small percentage of the whole object volume, it is concluded that the shell, in some embodiments significantly reduces the brittleness of the core. A small shell thickness is sufficient for including most or all of the defects and especially the edge points of horizontal cracks. The shell is produced without affecting the structure dimension accuracy as in fact it is part of the structure. The shell although contribute in addition to the interface shell-air, the interface shell-core (or shell-shell). The contribution of the shell towards the thermo-mechanical properties is particularly apparent in heavily cracked surfaces (shell-interface). Since the tough envelope material is produced simultaneously with the core, the envelope material contribute to a shell with perfect interaction with the core and where any irregularities in the core-shell interface are filled with the shell material and vice versa resulting in good covalent adhesion between the shell material and the core material (or intermediate shell). It forms a model-model mix layer that ensures gradual transition of the material properties at the interface. The tough shell fastens the edges of the stiff material's interface irregularities (model-model interface) and prevents their propagation and transformation into cracks.

The present study demonstrated that the core-shell structure of the present embodiments has an enhanced elastic modulus and crack resistance. Although the tough shelling material eliminates the weakness points at the surface of the stiff material, it relocates the outer surface cracks into its own volume. Therefore, it exhibits outstanding crack-resistance characteristics in order to provide the stiff core with proper protection. This property may be characterized either by impact resistance, essential work of fracture, $K_fC$ or other tests in which stress is applied to a pre-cracked specimen. In the present study, the materials' refining was based on Izod notched impact resistance values that were measured for vertically printed specimens, in which the horizontal print defects were located inside the notch surface. This test resulted in relatively low impact resistance values for all existing tested materials: VeroGray™~16 J/m, FC535~14 J/m and DurusWhite™~25 J/m. It is envisioned that for good crack protection performance the core-shell structure can pass this test with impact resistance of at least 30 J/m. While this value is easily achieved with soft materials, it is a rare property in materials having an elastic modulus above 1 GPa and HDT above room temperature.

Making the shell using compliant materials (e.g. VeroGray™ enveloped by TangoPlusBlack™) may not prevent crack propagation within the stiff material, because the compliant material shell may not restrain the edges of the cracks. The sharp stiffness transition at the model-model interface causes stress concentration when a load is applied and a fracture begins. In some embodiments, the modulus of the shell is at least one third of the core. This prevents rapid cracking of the model-model interface and bears the stress unless cracking occurs at the shell-support interface, i.e. outermost shell surface.

Use of one or more intermediate layers can further improve toughness. For example, the structure of the present embodiments can include three shells and a core with respective elastic moduli of about 0.2 GPa, about 0.6 GPa, about 1.8 GPa and about 3.5 GPa, where the last modulus is for the core, and the first modulus is for the outermost shell.

The thickness of the shell is preferably selected in accordance with the printing process characteristics. In the present study, the fabrication process was associated with interface roughness of about 150 microns. Therefore, a shell layer of at least 250 microns is preferred so as to achieve effective toughening. For a process that results in more precise interfaces, the thickness of the shell can be smaller. Increasing the thickness of the shell can improve the toughness of the structure to a thickness at which a maximum toughness is achieved. This was confirmed by the synergistic effect observed in the present study.

An advantage of the process of the present embodiments is that the core and the shell are fabricated simultaneously. This allows optimal overlap and adhesion in the interface between these two materials. Different post-printing processes for creating the outer shell were tested and compared to the result obtain by the simultaneous core and shell production process.

Design Method

In some embodiments of the present invention, a computer implemented method automatically performs dynamic adaptation of the shell to the specific elements of the printed structure, while taking into account at least one of the following parameters: spatial orientation of each surface, print mode (glossy or matte) and partition thickness. Such computer implemented method can map the structure on the tray and extracts the relevant parameters. Then it employs user input to calculate the corresponding shell (peripheral) structure for each region and assigns the voxels of the outer surfaces to the second modeling material. The computer implemented method can be executed by a control unit which controls the solid freeform fabrication apparatus (e.g., control unit 52, see FIG. 1) via a data processor (e.g., data processor 54).

Dimensional stability is predominantly expressed in thin parts which are typically subjected to higher stress and therefore tend to deform. In various exemplary embodiments of the invention for thin parts, the shell thickness is reduced. Alternatively, all the HIM or part thereof can be replaced with a DM which comprises a high $T_g$ material (for example, FCT™535) and HIM, e.g. random 50:50 distribution of both modeling materials.

The operator can be presented with a list of elements (region of the structure) thickness windows and their corresponding shell configuration. For example, 0.5 mm-1.0 mm elements can receive 0.1 mm HIM shell, 1.0 mm-2.0 mm elements can receive 0.2 mm shell, and thicker elements can receive 0.3 mm shell. The computer implemented method can take into account the 3D geometry of the part in order to produce the appropriate shell structure according to the geometry of the specific elements of the part. A schematic illustration of the resulting structure is shown in FIG. 13. In FIG. 13, the red sections are HTM and the yellow sections, i.e. outer envelope, are HIM.

The experimental testing of shell structures showed that the efficiency of the shell depends on print orientation. This is because the characteristics of the interface between the modeling and support material and the severity of surface defects differ among the x, y and z directions. The difference is predominantly between the x-y plane and the z direction. Specifically, defects at intra-layer interfaces between the modeling material and support material are more pronounced when both types of materials engage the same plane, and less pronounced at inter-layer interfaces. Therefore, the horizontal surfaces (perpendicular to the build direction) of a structure may contain a thinner shell, which may still provide sufficient improvement of toughness properties. In various exemplary embodiments of the invention the computer implemented method calculates the shell thickness to maintain a predetermined ratio between the three orthogonal directions. For example, at a ratio of x:y:z=2:2:1 the computer implemented method of the present embodiments can calculate the thickness of the shell which coats horizontal surfaces to be two times thinner than the thickness of the shell which coats non-horizontal surfaces.

In the fabrication process employed, there is a difference in the mechanical properties between a glossy surface and a matte surface. The experimental results showed that for glossy surfaces, even a single pixel (0.085 mm, in the present example) HIM shell provided brittle materials with a significantly improved toughness. For matte surfaces, on the other hand, the experimental results showed that a similar effect is obtained with 2 pixels (0.17 mm) Therefore, in some embodiments of the present invention the computer implemented method calculates different shell thicknesses for matte and glossy surfaces. In other embodiments glossy surfaces may be lack of shell and only matte surfaces will have shell.

The ability to form a multi-layered shell can be exploited to design complex shell structures, which provide the printed part with a superior balance between thermal stability and toughness. The computer implemented method developed by the inventors of the present invention allows defining a digital material that has a plurality of shells (e.g., from 2 to 10 shells). Each shell can be attributed with absolute thickness and can be made of any pure material or DM (including support material and DMs with support material).

It is appreciated by the present inventors that there are cases in which the process resolution does not allow deposition of two different materials at adequate resolution, and that some peeling of the shell can occur, particularly vertical walls that are not surrounded with support material. In these cases, the computer implemented method of the present embodiments calculates fabrication parameters for fabricating an intermediate shell that facilitate adhesion between the neighbor phases (shell-shell or shell-core). This intermediate shell can have a thickness of about 40-200 microns and can be made of a DM which comprises a combination of the modeling materials, preferably random 50%:50% deposition of the adjacent materials. Other intermediate shells are not excluded from the scope of the present invention. In experiments performed by the present inventors, random mixtures of 1:4 to 4:1 were shown to provide significant improvement of the structure print reliability. More than one DM can be used for the intermediate shell. As a representative example, three intermediate shells can be fabricated: an 85 μm shell of a DM at a surface density ratio of 1:3, an 85 μm shell of a DM at a surface density ratio of 1:1 random, and an 85 μm shell of a DM at a surface density ratio of 3:1.

In various exemplary embodiments of the invention the computer implemented method calculates fabrication parameters for fabricating a set of shells to provide gradual change of properties across the interfaces between the modeling materials. The shells can optionally and preferably made of DMs that comprise spatial distribution (preferably, but not necessarily random distribution) of different modeling materials with a different surface density ratio for each shell. Consider, for example, a core material which is stiff and brittle. Such core can be shelled with 4 shells (e.g., 100 microns each) wherein in each subsequent shell (from the outermost inward) the percentage of the tough component increases by 20%, so that the shell that is adjacent to the core has 80% of the core's material. This approach allows the reduction of stress concentration in the interface regions.

In various exemplary embodiments of the invention the computer implemented method calculates fabrication parameters for fabricating alternating shells. For example, a set of shells having alternating thermal and/or mechanical properties can be fabricated.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of layerwise solid freeform fabrication, comprising, for each of at least a few of the layers:
dispensing and hardening at least a first modeling material and a second modeling material to form a core region and one or more envelope regions at least partially surrounding said core region;
thereby fabricating an object being constructed from a plurality of layers and a layered core constituting core regions and a layered shell constituting envelope regions, wherein a width of said envelope region is calculated separately for each layer, said width being defined within a plane engaged by said layer.

2. The method according to claim 1, wherein said one or more envelope regions comprise a plurality of envelope regions.

3. The method according to claim 1, wherein for at least one pair of regions in said layer, a heat deflection temperature (HDT) characterizing an inner region of said pair is above 50° C., and an HDT characterizing an outer region of said pair is below 50° C.

4. The method according to claim 1, wherein for at least one pair of regions in said layer, an outer region of said pair has a lower elastic modulus than an inner region of said pair.

5. The method according to claim 1, wherein for at least one pair of regions in said layer, an outer region of said pair has a higher elastic modulus than an inner region of said pair.

6. The method according to claim 1, wherein for any pair of regions in said layer, an outer region of said pair has a lower elastic modulus than an inner region of said pair.

7. The method according to claim 1, wherein for at least one pair of regions in said layer, a characteristic heat deflection temperature (HDT) is higher for an outer region of said pair than for an inner region of said pair.

8. The method of claim 1, wherein each of said core and envelope regions is characterized by an elongation-at-break value ($\epsilon_R$), when hardened, and wherein said characteristic $\epsilon_R$ is higher for any of said envelope regions than for said core region.

9. The method according to claim 1, wherein said first modeling material and said second modeling material are characterized by a glass transition temperature ($T_g$) which is below 10° C.

10. The method according to claim 9, wherein a characteristic tensile tear resistance (TR) of said core region is lower than a characteristic TR of at least one of said envelope regions.

11. The method of claim 1, wherein each of said regions is characterized by an Izod impact resistance (IR) value and a heat distortion temperature (HDT), when hardened, wherein for at least one pair of regions in said layer, an inner region of said pair is characterized a lower IR value and higher HDT value relative to an outer region of said pair.

12. The method according to claim 11, wherein said outer region is an outermost region of said pair.

13. The method according to claim 1, wherein a width of said envelope region is non-uniform across said layer.

14. The method according to claim 1, further comprising dispensing at least one of said first modeling material and said second modeling material to form at least one shell part parallel to said layers, wherein a material property characterizing said at least one shell part is different from a material property characterizing said core.

15. The method according to claim 14, wherein said at least one shell part has a thickness which is less than a lateral width of said envelope.

16. The method according to claim 1, wherein, any two adjacent regions of said regions are bound to each other upon hardening.

17. The method according to claim 1, wherein a ratio between the elastic moduli of adjacent regions, when hardened, is from about 1 to about 20.

* * * * *